(12) United States Patent
Collins et al.

(10) Patent No.: US 11,245,134 B2
(45) Date of Patent: Feb. 8, 2022

(54) LITHIUM ENERGY STORAGE DEVICE WITH COMPOSITE ANODE

(71) Applicant: International Business Machines Corporation, Armonk, NY (US)

(72) Inventors: John Collins, Tarrytown, NY (US); Ali Afzali-Ardakani, Ossining, NY (US); John M. Papalia, New York, NY (US); Devendra K. Sadana, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 16/366,559

(22) Filed: Mar. 27, 2019

(65) Prior Publication Data

US 2020/0212492 A1 Jul. 2, 2020

Related U.S. Application Data

(60) Provisional application No. 62/787,612, filed on Jan. 2, 2019.

(51) Int. Cl.
*H01M 10/0585* (2010.01)
*H01M 10/0565* (2010.01)
(Continued)

(52) U.S. Cl.
CPC ..... *H01M 10/0585* (2013.01); *H01M 4/0402* (2013.01); *H01M 4/133* (2013.01);
(Continued)

(58) Field of Classification Search
CPC . Y02E 60/10; H01M 10/052; H01M 10/0585; H01M 4/133; H01M 4/134;
(Continued)

(56) References Cited

U.S. PATENT DOCUMENTS 6,197,450 B1   3/2001   Nathan et al.
6,900,114 B2   5/2005   Ohmi et al.
(Continued)

OTHER PUBLICATIONS

Lixiang Liu, et al.; Advances on Microsized On-Chip Lithium-Ion Batteries; "Advanced Science News," "Small" 2017, 13, 1701847, 12 pages; Wiley-VCH Verlag GmbH & Co. KGaA, Weinheim.
(Continued)

*Primary Examiner* — Imran Akram
(74) *Attorney, Agent, or Firm* — Daniel P. Morris; Lou Percello, Attorney, PLLC

(57) ABSTRACT

A Lithium energy storage device comprising a cathode, electrolyte, anode, and substrate. The materials contained in the anode and electrolyte region are electrochemically altered during initial formation and exposed to current cycles to create a lower impedance composite anode. The resulting composite anode bottom is a bi-layer comprising: i. a lithium metal layer and ii. a silicon-based interphase layer. The bi-layer acts as a barrier to inhibit Lithium ions from entering or leaving a Lithium saturated substrate, once the interphase surface is formed and the substrate is saturated with Lithium ions. This prevents cell failure from large volume changes/stresses during charge/discharge cycles and enables a significant decrease in cell impedance to enable better rechargeable cell performance.

20 Claims, 17 Drawing Sheets

(51) Int. Cl.
*H01M 10/0525* (2010.01)
*H01M 4/133* (2010.01)
*H01M 4/04* (2006.01)
*H01M 4/525* (2010.01)
*H01M 4/505* (2010.01)
*H01M 4/134* (2010.01)

(52) U.S. Cl.
CPC .......... *H01M 4/134* (2013.01); *H01M 4/505* (2013.01); *H01M 4/525* (2013.01); *H01M 10/0525* (2013.01); *H01M 10/0565* (2013.01); *H01M 2300/0045* (2013.01); *H01M 2300/0082* (2013.01)

(58) Field of Classification Search
CPC .... H01M 4/587; H01M 4/366; H01M 50/449; H01M 50/46
See application file for complete search history.

(56) References Cited

U.S. PATENT DOCUMENTS

| | | | |
|---|---|---|---|
| 7,368,332 B2 | 5/2008 | Moriwaki et al. | |
| 7,618,748 B2 | 11/2009 | Nathan et al. | |
| 7,803,199 B2 | 9/2010 | Kawakami et al. | |
| 7,811,702 B2 | 10/2010 | Laurent et al. | |
| 8,003,244 B2 | 8/2011 | Hahn | |
| 8,889,295 B2 | 11/2014 | Yushin et al. | |
| 9,379,368 B2 | 6/2016 | Roumi | |
| 9,761,876 B2 | 9/2017 | Mori et al. | |
| 9,991,492 B2 | 6/2018 | Roumi | |
| 2017/0098823 A1 | 4/2017 | Yushin et al. | |
| 2017/0294643 A1* | 10/2017 | Burshtain | H01M 4/1395 |
| 2017/0338467 A1 | 11/2017 | Saito et al. | |

OTHER PUBLICATIONS

Takahide Murayama, et al.; "Micro Thin-film Li-ion Battery Stacking Challenge by Backside Via Last TSV Technology"; IEEE XPLORE Catalog Nos. CFP 1759B-ART; 978-1-5386-4719-6/16/$31.00, 2017 IEEE; ISBN:978-1-5386-4719-6; pp. 183 through 186; In IEEE 2017 12th International Microsystems, Packaging, Assembly and Circuits Technology Conference (IMPACT), 2017.

Hahn et al.; "Silicon Integrated Micro Batteries based on Deep Reactive Ion Etching and Through Silicon Via Technologies"; 978-1-4673-1965-2/12/$31.00 © 2012 IEEE; pp. 1571 through 1577; In 2012 IEEE 62nd Electronic Components and Technology Conference (ECTC).

Share et al. "Surface engineering of nanomaterials for improved energy storage—A review"; "Chemical Engineering Science"; 154 (2016) 3-19; pp. 3 through 19.

* cited by examiner

LITHIUM ENERGY STORAGE DEVICE WITH COMPOSITE ANODE

BACKGROUND

The present invention relates to the field of semiconductor devices, more specifically to semiconductors used in energy storage devices.

The integration of energy storage devices, e.g. batteries, in microprocessor and memory chips is a significant requirement for the IoT (Internet of Things) devices and other applications. In addition to IoT applications, emerging applications requiring these on-board next generation energy storage devices include mobile devices; sensory equipment; and autonomous environmental, biological, and social functioning machines. Common examples of such functional devices are smart dust and/or biomedical sensory/drug-delivery devices. Additionally, most or all solid-state energy storage devices will progressively integrate lithium metal electrode material into its overall cell structure due to lithium metal's extremely high theoretical specific capacity (3860 mAh/g.)

Over the next generation, as human controlled and autonomous devices increasingly become miniaturized, total energy consumption requirements for electronic devices will decrease. Power consumption is expected to be lower than 1 Watt for these devices. However, because of device miniaturization, the energy storage devices providing device power will need to be miniaturized as well, sometimes be embedded in CMOS circuits, and will need high energy and power density.

Because of the pervasive use of miniaturized energy storage devices, e.g. batteries, there is a need for a silicon-based energy storage housing unit with a structure that both protects and is protected from the external environment. Storage device design features are needed to enable the efficient mass fabrication of the entire miniature energy storage device via 3-dimensional features.

Additionally, there is an increasingly sharp demand for safe, well contained, all solid-state energy storage for microelectronic devices with the evolution of micro-electronics in the Internet of Things (IoT), like in the health care industries. The demand for all-solid state higher gravimetric and areal capacity (area-normalized capacity) energy storage devices packed in smaller volumes and areas drives competitive exploration of next generation materials, structures, designs, and methods, especially via solid state microbatteries.

Conventional all-solid-state Li-ion batteries maintain control of performance via standard thin film encapsulation and packaging techniques (e.g., 2.5D packaging-progressive layering methods.) Unfortunately, theoretically high capacity 3D (e.g. manufacturing processes using relatively larger volume components) thin film microbatteries continue to fail commercially due to leakage, dielectric breakdown, 3D fabrication failings, and parasitic cell degradation. Generally, 3D microbattery milestone failures, combined with cost, time of assembly and large active/packaging areas (>1 mm$^2$) of 2.5D form factors, limit the commercial practicality of current microbattery demand in an ever-shrinking foot print market.

SUMMARY

Some embodiments of the present inventions disclosed include the structures, devices, and methods of making and use of energy storage devices like lithium batteries and associated components and combinations. Disclosed are novel materials and designs that provide conductive and/or adhesive improvements and containment enhancements in the structures, methods, use, and operation of energy storage devices. Many of these embodiments have at least one electrode or another component made with a lithium metal and/or composition. Other embodiments include all solid-state lithium batteries.

An embodiment of the present invention is a Lithium energy storage device comprising novel cathode, electrolyte, anode, and substrate structures, combinations and operations. The cathode is made of a Lithium cathode composition, has an external cathode connection, and is capable of producing Lithium ions. The electrolyte has an electrolyte top interface with the cathode and an electrolyte bottom interface with the anode. A portion inside the full thickness of the electrolyte coverage contains a separator (dielectric) material which prevents the conduction of electrons through the electrolyte medium. The electrolyte top interface is electrically, chemically, and physically connected to the cathode. A top of the anode (anode top) is electrically, chemically, and physically connected to the electrolyte bottom interface. The anode bottom is a bi-layer comprising: i. an interphase layer and ii. a Lithium metal layer. The Lithium metal layer connects a novel anode composition to and through the interphase to surface of a solid silicon substrate with an external electrical connection.

Once the bi-layer (Li-metal with the interphase) is formed and the substrate is saturated with Lithium ions, the bi-layer acts as a barrier to inhibit Lithium ions from entering or leaving the Lithium saturated substrate. This prevents failures from large volume changes/stresses of the substrate during charge/discharge cycles. The bi-layer contains and protects the battery internals. The silicon substrate surrounding the battery internals also contains and provides structural integrity by containing one or more of the battery components in a trench structure, partially bounded both by the bi-layer and the surrounding substrate.

Novel materials and methods are also disclosed.

BRIEF DESCRIPTION OF THE DRAWINGS

in each of the embodiments of i. FIG. 2A and FIG. 2B and ii. FIG. 2C and FIG. 2D, respectively.

DETAILED DESCRIPTION

Figure 1:
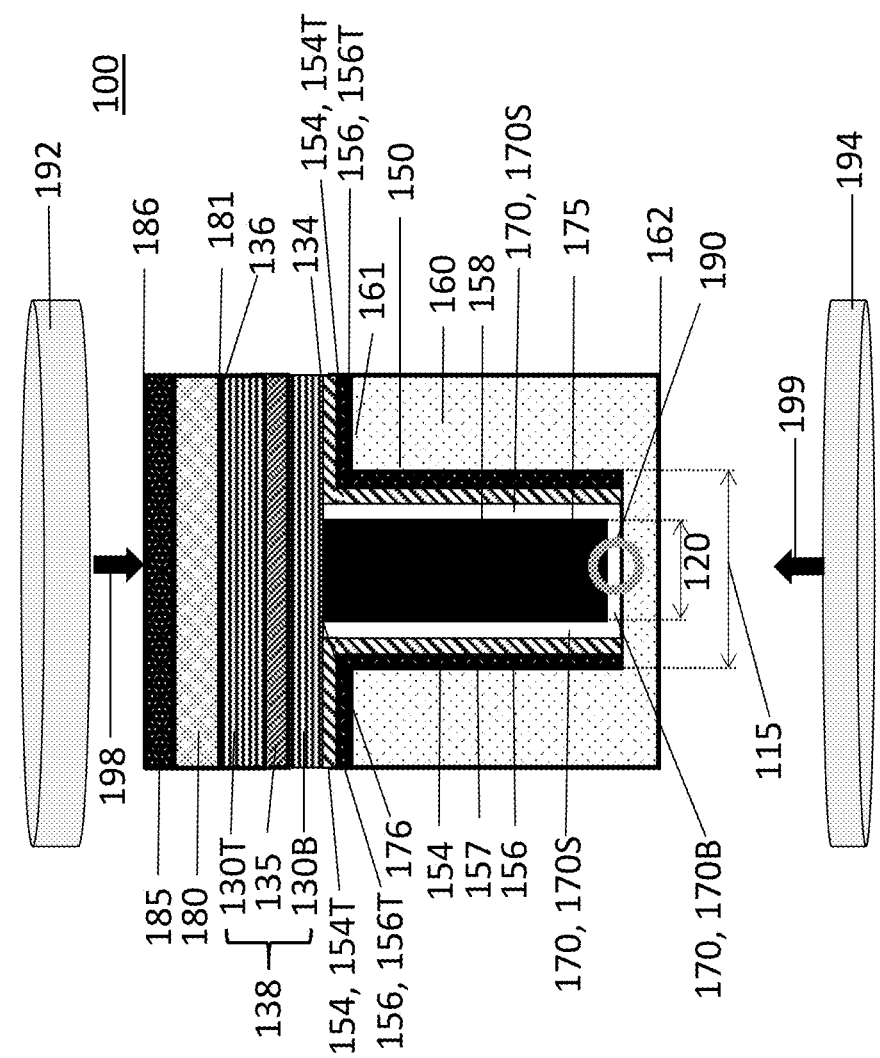
FIG. 1 is a block diagram of a cross section elevation view of one preferred novel structure of a Lithium ion battery prior to galvanostatic current cycling showing example precursors used to form a novel active region interface and other compositions and structures.

Among other things, compositions, structures, methods, devices, and uses are disclosed that affect the cross-linking and adhesion between interfaces and material properties and function within an energy storage device. These features facilitate electron and ion-charge transfer throughout the electrochemical components of the energy storage devices both during formation of interfaces and materials and during general operation of the device.

Also considered are the physical and chemical conditions of how electrochemically active energy storage components are synthesized; bonded together; and electrically, ionically, and physically isolated, particularly using 3D substrate and conformal layer deposition manufacturing methods. These features also determine performance capabilities within an effective energy storage device.

The independent treatment of component layers within an electrically and ionically insulated energy storage housing unit can facilitate the fabrication, manufacture, operation, and use of highly efficient working energy storage devices. One preferred embodiment is the In-Silicon [trench] processing through control of physical parameters (e.g., pressure and temperature). During fabrication, the physical and chemical conditions of component layers are altered, especially regarding a solid/semi-solid electrolyte. Such independent treatment methods and resulting structures are disclosed in order to increase energy storage device functioning performance characteristics with special focus on improving general energy/power density, lifecycle, internal resistance reduction, and interfacial chemical bonding.

Further, one preferred method to achieve high performing energy storage device components is to administer the synthesis and inter-material bonding of energy storage device components during electrochemical cycling of the completed energy storage device, e.g. in-situ composite material formation. The inter-layer bonding capabilities and resulting charge-conductive/charge-transfer properties of the respective component layers can be optimized via controlled electrochemical conditions, prior to full cell cycling, where the in-situ induced chemical change tunes a highly material-dependent and efficient solid state or semi-solid state energy storage device which enables high performance rechargeable ion charge storage through strongly bonded, low-impedance internal layers. Such novel composite structures result in very low interfacial-induced charge-blocking resistance.

Because the prior art does not effectively synthesize and/or electrochemically bond active energy storage components and/or make and use improved compositions of matter, the following are some of the deficiencies that exist in the prior art:

1. Reduced high-power density function or long energy delivery (high energy density) capability.
2. Limited integration into single, small volume, low weight special dimensions.
3. Limited to liquid electrolyte use—which has inherent safety hazards (especially the organic components of liquid electrolytes.)
4. Reduced durability and sustainability of encapsulation/packaging (poor puncture resistance) or degradation upon use, causing openings to outside environment resulting in fires from Lithium exposure to oxygen.
5. Constrained processing methods for fabricating energy storage active layers in an in-situ fashion at a device or assembly level.
6. Failure to fabricate electrically/electrochemically active 3D substrates which do not result in cell failure via dielectric breakdown and/or inter-layer integration.
7. Failure to fabricate electrically/electrochemically active 3D substrates which facilitate the integration of all solid-state and/or semi solid-state energy storage device components.
8. Failure to fabricate electrically/electrochemically active 3D substrates which facilitate the integration of all solid-state and/or semi solid-state energy storage device components using slurry and casting type deposition methods.
9. Failure to create composite active materials in an energy storage device residing within the substrate of a microelectronic device.
10. Failure to create composite active materials in an energy storage device residing within the substrate of a microelectronic device, where the composite active material created in the energy storage device includes or incorporates the microelectronic device substrate.
11. Failure to incorporate crystalline silicon as active electrode material in a Lithium based energy storage device, without the incorporation of carbon conductive additive materials mixed with crystalline silicon in a homogenous fashion. The prior art also has well documented short comings specifically related to lithium metal electrode and/or Lithium compound containing-based energy storage devices, such as:
    i. Incomplete or lack of Lithium metal spatial control when the device use is underway.
    ii. Unsaturated Lithium metal interface between electrode and electrode-contact materials.
    iii. Ineffective electrode substrates or treated electrode surfaces which enable lithium metal adsorption/desorption reduced stresses and/or suppress lithium metal dendrite formation.
    iv. Ineffective electrode substrates or treated electrode surfaces (e.g. Silicon) which allow for suitable nucleation or Lithium hosting sites, thereby limiting the performance of the Lithium/electrode material created in-situ and typically leading to cell failure (e.g. dendritic growth of Lithium metal).
    v. Ineffective use of crystalline 2D and/or crystalline 3D silicon material as an energy storage device electrical contact for electrode materials.
    vi. Ineffective use of crystalline 2D and/or crystalline 3D silicon material as an energy storage device electrical contact for electrode materials and for use as sustainable, Li-charge hosting composite anode material.

Energy storage devices with all solid-state components also have well documented drawbacks primarily in their ability to:

1. Maintain low interfacial resistance between independent active energy storage/energy mobile layers as well as electrical contacts of the electrode materials, especially after multiple electrochemical charge and discharge cycles.
2. Improve interfacial impedance (decrease cell impedance) between independent active energy storage/energy mobile layers as well as electrical contacts of the electrode materials, especially after multiple electrochemical charge and discharge cycles.
3. Create thick cathode materials with low internal resistance, as well as low interfacial impedance, and/or significantly control or mitigate electrochemically accessible surface area of cathode materials viable for high capacity and high power efficient rechargeable cycling.
4. Maintain electrochemically (e.g., ionically, electronically) labile interfaces between electrolyte and electrode and electrode contact materials due to insufficient chemical bonding and/or interlayer adhesion at the electrolyte/electrode and electrode/electrode contact interfaces. Lability in the definition used above refers to the layer or interfacial material (per unit area, volume, density, etc.) having high ability (long electrochemical lifetime) of being ionically and/or electronically conductive.

There is a need to improve the structural and chemical bonding of electrochemically active energy storage components to enable more compactly adhered and stable structures with higher energy storing capacity and power delivery per unit volume, area and/or mass, reduced device internal resistance (particularly at material interfaces), increased durability, extended cycling lifetime and reduced leakage. Interfacial media used in electrochemical energy sources or microelectronic devices can extend the lifetime and average or performance capabilities (e.g., power/rate capabilities, translational mobility of charge, average area of high functioning charge-conductive and/or host-capable material, etc.)

These issues are addressed in part using a novel silicon-based encapsulation and packaging in conjunction with composite silicon-based electrode material. Methods are disclosed to fabricate novel materials and conformally deposited all-solid-state Li-ion materials into 3D trench patterned silicon substrates, using advanced solid polymer electrolyte (SPE), using interfacial additives (e.g. LiTFSI containing Polyaniline (PAM)) combined with commercially available battery materials (e.g., graphite and Lithium Iron Phosphate (LFP)).

Illustrative embodiments of these inventions may be described herein in the context of illustrative methods for forming energy storage devices, along with illustrative apparatus, systems and devices formed using such methods. However, it is to be understood that embodiments of the invention are not limited to the illustrative methods, apparatus, systems and devices but instead are more broadly applicable to other suitable methods, apparatus, systems and devices.

It is to be further understood that the present disclosure will be described in terms of a given illustrative architecture; however, other architectures, structures, substrate materials and process features and steps may be varied within the scope of the present disclosure.

It will also be understood that when an element such as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well as any other variations, appearing in various places throughout the specification are not necessarily all referring to the same embodiment.

Features with the same reference number in different Figures perform the same function and have the same description unless the description is modified in a later Figure.

FIG. 1 is a block diagram of a cross section elevation view of one preferred novel structure of a Lithium ion battery 100 prior to galvanostaic current cycling showing example precursors and structures used to form of a novel active region 190 interface, a novel composite anode, a novel electrolyte, and other compositions and structures.

A preferred embodiment of the energy storage device 100 comprises a silicon substrate 160 comprising at least one trench 150 (one or more trenches 150) disposed therein. The (at least one) trench 150 provides an energy storage device containment feature with chemical, ionic, and electronic conductive access to a formed active region interface 120 and 190 (including the region created with a LiTFSI/PANI/graphite mixture in a preferred embodiment), a transition region (or layer) 172 (refer to FIG. 2D), and anode 175. After current cycling, in a preferred embodiment the anode 175 becomes a composite anode 175A which can be viewed as containing lithiated crystalline silicon 160A, a silicon-based interphase layer 230, the lithium metal layer 240, and the transition layer 172 which further includes a Lithium salt (LiTFSI), PANI, graphite, and electrolyte materials. (Here the bi-layer is the silicon-based interphase 230 and the lithium metal layer 240 which maintains a desired mobility control of Lithium ions.) In addition, during the current cycling and the formation of the bi-layer, the substrate 160 becomes a lithiated substrate 160A.

In some embodiments one or more insulation layers (154, 156) cover the sides of the trench 150. The trench 150 or the trench in combination with the insulation layers (154, 156) create a 3D space in which an electrode 175 (e.g. an anode 175) is deposited. In some embodiments a layer 170S is disposed between the anode 175 and the insulation layer(s) (154 or 156.)

In one preferred embodiment of such energy storage housing the components are created by implementing three-dimensional (3D) space/volume cavities, micro-cavities, channels, or trenches 150 typically through etching, pressure, or otherwise destructive methods implemented onto/into two-dimensional (2D) substrates 150 such as silicon. The beneficial aspects of implementing energy storage housing devices into such semiconductor-type materials as silicon are paramount for the integration of power devices into commercially-ubiquitous starting substrates of technologically smarter, more autonomous and capable functioning devices. The need for the standardization of energy storage housing devices that can be commercially utilized for the storage of both thin film (relatively lower capacity/higher power density capability) and thicker films, layers, or components (relatively higher capacity/lower power density capability) is critical in the commercial development of micro-power and micro-battery capabilities.

The substrate 160, in one embodiment, may be made from a base material 160 such as a non-porous silicon (Si)-based substrate, a single-crystal non-porous Si substrate, crystalline silicon, a low resistance doped (e.g., Boron-doped) crystalline silicon material, and a partially porous crystalline silicon material and/or the like. The doped crystalline silicon material is doped with Boron at a concentration of approximately $10^{19}$ $cm^{-3}$. In one example, the substrate 160 may have a vertical thickness ranging from 5 μm to 1000 μm although other thicknesses are applicable as well. The horizontal width of the substrate 160 may vary based on a number of energy storage devices (in trenches 150) that are to be formed. A first set of trenches 150 may be formed on the top side of the substrate 160 and a second set of trenches 150 may be formed on the bottom-side of the substrate (not shown.) The trenches 150 may be formed utilizing etching, such as deep reactive-ion etching (D-RIE), or wet etching methods utilizing chemicals such as hydrofluoric acid, or any other standard technique. More generally, any top-down method may be used to create the trenches 150 by etching or removing a desired amount of the silicon substrate 160. In one embodiment, the second set of trenches 150 are formed by flipping the substrate over on a substrate holder and then performing the patterned etching process(es).

For instance, 3D features (≤1 $mm^2$) in crystalline silicon substrates are created via standard microfabrication methods (e.g. through silicon via (TSV) reactive ion etching (RIE)). For example, 16 trenches (1 $mm^2$ area, 350 μm depth, at a 2 mm pitch) enabled manufacture of multiple 35 mm×35 mm chiplets on a 200 mm wafer.

The substrate 160 has a top surface 161 and a bottom surface 162.

In preferred embodiments, the trenches 150 may have a horizontal width (201 in FIG. 2A) with a trench bottom area 115. The width 201 ranges from less than 5 μm to greater than 1 mm, and a vertical thickness or height ranging from less than 5 μm to greater than 400 μm, although other dimensions are applicable as well. In some embodiments, the trench depth does not exceed approximately ¾ of the thickness of the substrate 160. The trenches may be rectangular, circular, etc. as determined with the required shape of the desired form factor. The second set of trenches 150 are optional and can have similar dimensions and shape or can be different in dimensionality and/or used differently.

The trenches 150 have a trench bottom (shown in FIG. 2), one or more trench sides (typically 157), a trench depth, and a trench opening at the top of the trench 150 with a trench opening area. The trench bottom has a trench bottom area 115 of the trench that interfaces with the substrate 160 at the trench bottom. The trench 150 sides (typically 157) are shown as the vertical surfaces of the trench 150 in FIG. 1, the trench opening opens through the substrate 160 top surface as shown in FIG. 1. The trench 150 depth is measured from the substrate 160 top 161 to the trench bottom. A trench cavity 158 is defined by the trench bottom and trench sides 157 and/or the material (154, 156, and optionally 170S) deposited on the trench bottom 170B and trench sides 157. Locations of these components is evident from inspection of FIGS. 1 and 2 of this description where some reference numbers may be omitted for clarity.

In some preferred embodiments, the trench 150 sides 157 are covered with one or more insulating layers (154, 156.) The insulating layers (154, 156) provide further containment for the battery electrode (e.g., anode) 175 contained in the trench cavity 158 and prevent external contaminants from entering the cavity 158 or internal components from leaking out to the external environment. Additionally, the insulating layers effectively control the directionality and isolation of ion movement throughout the energy storage device—which enables a less resistive, better performing energy storage capability. The opening (patterning) of insulating layer(s) enables spatial control of electrical contact between ion-containing energy storage device components (e.g., anode or composite anode) and the electron-providing substrate (e.g., silicon). Such patterning capability enhances performance through control of electrode/contact area and high suppression of leakage within the energy storage device.

In some preferred embodiments, one or more of the insulating layers (154T, 156T) also covers the substrate top external to the trench opening. These layers (154T, 156T) provide addition isolation of the device 100 internal components and provide an electrical insulation barrier to the components above them.

In some preferred embodiments, there is a single insulating layer 154 on the trench sides and/or the substrate 160 top 161. In other preferred embodiments, there are one or more additional insulating layers (154, 156) on the trench sides (157) and/or the substrate 160 top 161. The insulating layers are made of electrically and/or ionic-insulating material that have structure strength and the ability to contain, e.g. prevent the penetration of, and act as a barrier against reactive materials like Lithium, Lithium ions, electrons, etc. Preferred materials for the insulation layers (154, 156, and optionally 154T and 156T) include: silicon dioxide ($SiO_2$), $SiO_2$ and silicon nitride ($Si_3N_4$) combinations, $Si_3N_4$., etc.

In preferred embodiments, the total thickness of the insulating layers (154, 156) is between 200 nm and 500 nm. Other ranges possible for total thickness of the insulating layers can be less than 50 nm or greater than 700 nm. The insulating layers (154, 156) are deposited by any one or more of the following: physical vapor deposition (PVD), chemical vapor depositions (CVD), atomic layer deposition (ADL), etc. Deposition treatment such as annealing can be utilized to modulate the physical resulting properties of the insulation layer(s) (e.g., hardness, adhesion, etc.)

The selection and/or deposition ordering of the insulating layers (154, 156) can depend on the desired properties for the final layered structure and include properties like: electrical insulation, adhesion, material strength, ion, electron penetration susceptibility, mechanical penetration strength, and directionally based strength of chemical and/or ionic containment, isolation and translational motion.

In preferred embodiments of the device 100 there are no insulating layers (154, 156) or any other material on the trench 150 bottom or desired portions of the trench 150 bottom. This is to enable electric contact between the active region interface 190 (and to the anode 175) and the substrate 160 using novel materials and methods as described below.

In one embodiment, the field, sidewalls and base of the 3D trenches were conformally patterned with electron/ion insulating materials (e.g., $SiO_2$ and/or $Si_3N_4$). In one embodiment, insulation was partially etched away at trench bases to create an electrical connection between the active battery material and silicon substrate utilized during formation of the active layer and general battery operation. In a preferred embodiment, a conductive polymer adhesive mixed with a Lithium containing compound is placed on the trench bottom and heat treated. In preferred embodiments, active battery material slurries (e.g., graphite, polymer electrolyte, interfacial additives) filled the insulated trenches, were pressed, heated, and dried—yielding well adhered silicon encapsulated battery cells. In preferred embodiments, the top of the trench was subsequently covered in polymer electrolyte saturated polyacrylnitrile (PAN) separator material and was then planarized with a metal contact laminated cathode material (Lithium Iron Phosphate—LFP) via conductive epoxy. The In-silicon energy storage devices were then diced to obtain the desired number of parallel microbatteries and total footprint. Finished In-silicon microbattery cell(s) were encapsulated with coin cell materials. More description of methods of making are provided below.

In a preferred embodiment, a novel conductive polymer adhesive layer (170, 170B) is disposed on the substrate 160 on the trench bottom area 115 covering the entire (active) area 120 of the trench bottom. The conductive polymer adhesive layer (170, 170S) may optionally be disposed over the insulating layers (154, 156) on the trench sides depending on the method of manufacturing and/or other design choices.

In preferred embodiments, the thickness of the conductive adhesive mixture (170, 170B) layer on the trench bottom is between 20 nm and 10 μm when initially deposited and integrated with the full energy storage device. However, other thicknesses are possible outside the range specified. A preferred thickness range is between 30 nm and 500 nm. The adhesive mixture (170, 170B) is in direct physical, chemical, electric contact with the substrate 160 at the active area 120 of the trench bottom.

(Note that the thickness of the deposited Li-containing PANI layer (170, 170B) may decrease once the cell is electrochemically cycled (pre-cycle treatment). Thickness decreases may be up to or greater than 75% of the initial PANI layer (this is comparing pure PANI layer in initial full cell vs the pure (non-composite integrated PANI) layer in post-cycled full cell.)

The thickness of the optional conductive adhesive mixture (170, 170S) layer on the trench side is between 20 nm and 10 μm, with a preferred thickness embodiment of 5 nm and 500 nm. However other thicknesses outside of this range are possible.

The conductive adhesive mixture layers 170 are deposited by any one or more of the following: polymer casting, hot casting, spin coating, micro or nanopipette deposition, pressurized micro or nanopipette deposition, doctor blading, hot blading or any method which sufficiently deposits the polymer based conductive adhesive at the desired trench or substrate locations.

The conductive adhesive mixture (170, 170S, 170B) is transformed in its physical and chemical properties through an annealing step after deposition on/in the substrate. The anneal step, among other changes, alters the chemical adhesion and inter/intra chemical cross-linking of the PANI material—thereby advancing the conductivity, structural integrity and adhesion of the adhesive mixture as well as the adhesive mixture/Silicon interface 170B.

Figure 2:
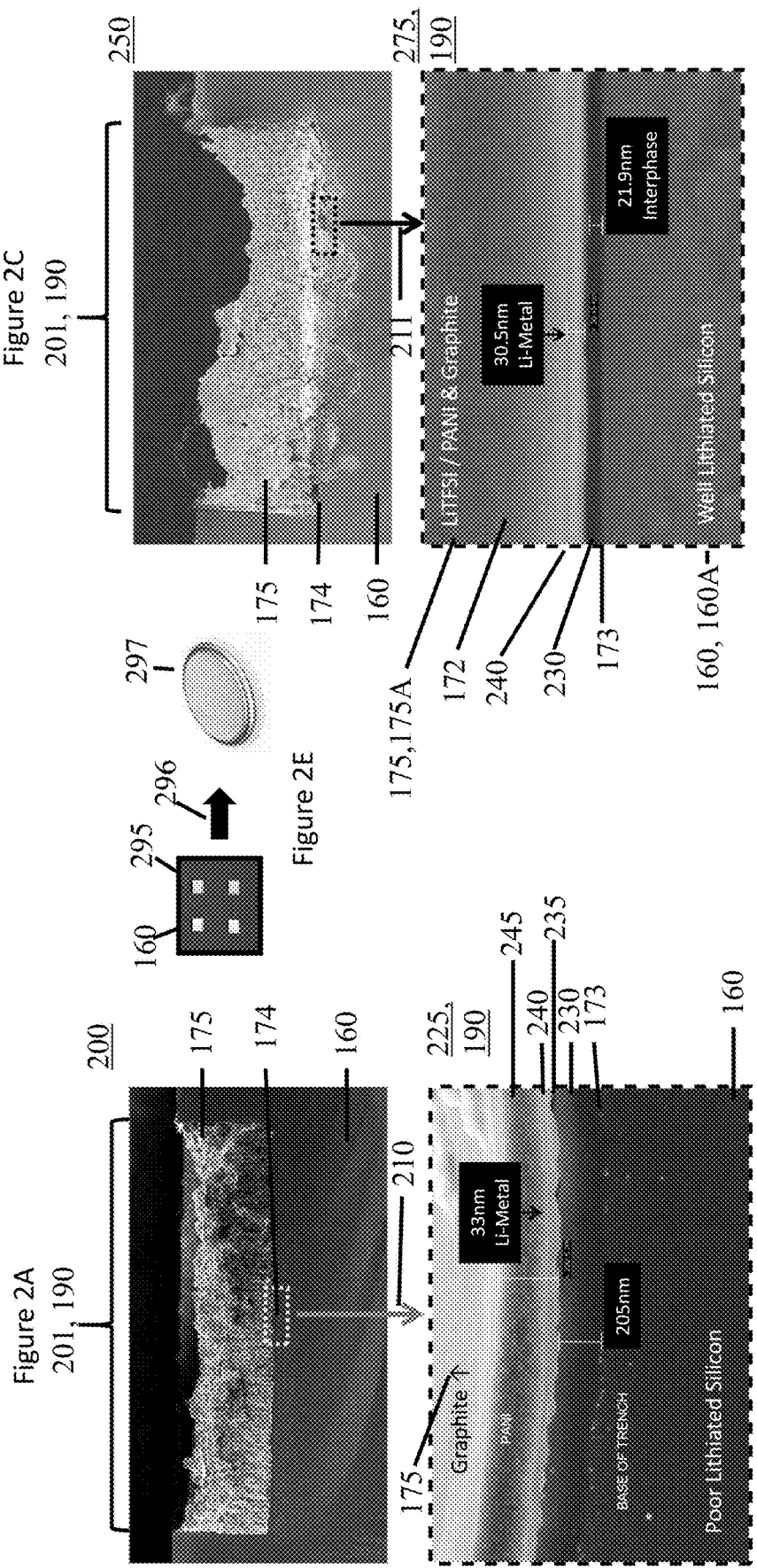
FIG. 2A is a post-mortem micro graph image of a cycled battery showing materials, layers, and interfaces at an active region interface within a substrate (over the full trench width) resulting from no Lithium compound mixed within interfacial additive prior to galvanostatic current cycling.
FIG. 2B is a magnified micro graph image of part of the anode interface region in FIG. 2A.
FIG. 2C is a post-mortem micro graph image of a cycled battery showing materials, layers, and interfaces at an active region interface within a substrate (over the full trench width) resulting from Lithium compound mixed within interfacial additive prior to galvanostatic current cycling.
FIG. 2D is a magnified micro graph image of part of the anode interface region in FIG. 2C.
FIG. 2E is a diagram showing configuration of four microbatteries electrically connected in parallel on a silicon wafer which is encased in a coin cell.
Figure 14:
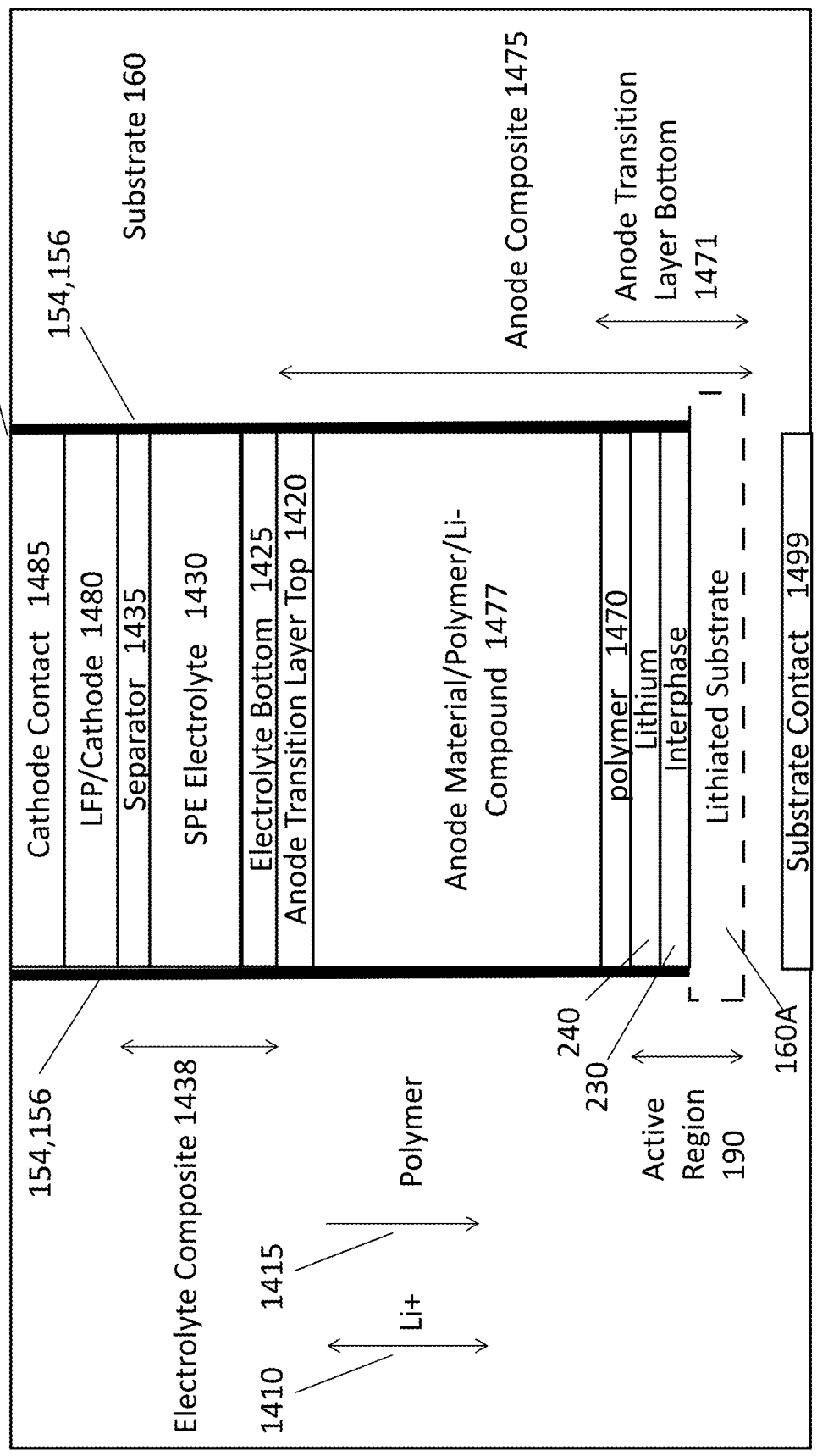
FIG. 14 is a block diagram of one preferred structure of the present invention after galvanostatic current cycling is applied showing a novel composite anode and novel composite electrolyte.

The conductive adhesive mixture (170B) is transformed by novel methods to create a novel active region interface 190 partially circled 190 in FIG. 1 and explained in more detail in FIGS. 2 and 14.

In preferred embodiments, the trench 150 cavity 158 is structurally defined by the transformed adhesive mixture (170, 170B) on the trench active area 120 and either the adhesive mixture layers (170, 170S) or the insulating layers (154, 156) on the trench 150 sides. In a preferred embodiment, the trench cavity 158 is filled with a 3D volume of a storage device electrode, e.g. anode 175 material. In another preferred embodiment, the trench cavity 158 is filled with a 3D volume of a storage device electrode, e.g. anode 175 material followed by polymer electrolyte material 130B which extends above and below the top plane of the 3D trench.

The substrate 160 material on three sides of the trench 150, the insulating layers (154, 156), optionally the adhesive mixture (170S) transformed on the sides, and the transformed adhesive mixture 170B on the bottom active area 120, creates a strong electrical, chemical, and physical contact of active energy storage device materials and electrical contacts as well as provides an excellent containment structure for the anode 175 and the active region interface 190.

In addition, once formed the bi-layer (230, 240) form a containment barrier at the trench bottom area 115 which promotes the mechanical and structural integrity, and therefore the resistance-dependent charge-storage performance capability, of the Li-active silicon material residing below the trench bottom as Lithium material is mobilized into or out of the silicon material during reversible electrochemical cycling.

In preferred embodiments, the electrode/anode 175 is made of any anodic material including: graphite, lithiated graphite, carbon and lithium based mixtures, lithium metal, lithium powder, lithium powder and/or lithium composite material saturated in conductive adhesive mixture 170, lithium titanate material (LTO), silicon, crystalline silicon, silicon/carbon composite material, silicon/carbon/additive composite material, lithium powder/carbon/solid electrolyte composite, or any other suitable Li-charge hosting anode material(s.)

The electrode/anode 175 is deposited using known techniques and methods including: wet material deposition (e.g., slurry deposition via nano or micropipette, slurry casting, doctor blading, spin coating or any other suitable method of depositing "wet" active electrode materials) or dry material deposition (e.g., Vacuum deposition techniques such as physical vapor deposition, atomic layer deposition, chemical vapor deposition, etc.). In a preferred embodiment, the electrode/anode 175 fills the entire available volume in the trench cavity. In another preferred embodiment, the electrode/anode 175 fills nearly the entire available volume in the trench cavity, with the polymer electrolyte material filling the top-most portion of the trench cavity. In yet another preferred embodiment, the entire cavity is filled with all active energy storage device components (anode, electrolyte, separator (if needed), cathode, electrical contacts and interfacial additive materials).

The anode 175 has an anode bottom 174 (in FIG. 2A) interfacing through the adhesive mixture (170, 170B) at the bottom of the trench and within the substrate 160. The anode 175 has an anode top that, in preferred embodiments is coplanar with the top of the insulating layers (154T, 156T) on the substrate top 161 (or the substrate top 161, if no insulating layers) but having a top anode surface uninsulated and able to electrically connect to electrolyte layers 130. An additional preferred embodiment has the anode 175 with an anode top nearly coplanar with the top of the insulating layers (154T, 156T) on the substrate top 161 (or the substrate top 161, if no insulating layers) but having a top anode surface uninsulated and able to electrically connect to electrolyte layers 130, where the electrolyte layers 130 extend into the trench, beyond (into) the top plane of the substrate top 161, with the electrolyte layer being coplanar with the top of the insulting layers (154T, 156T) on the substrate top 161 (or the substrate top 161, if no insulating layers). The anode bottom 174 is physically, electrically, and chemically attached to and integrated with the substrate 160 after the active region interface 190 is formed. During formation of the active region 190 ions are allowed to pass between the anode bottom 174 and the substrate 160 to lithiate the substrate 160A. The novel formation and composition of the active region 190 at the anode bottom 174 lowers of the interfacial impedance of the electrochemically working cell, as described below.

An electrolyte 138, e.g. a Solid Polymer Electrolyte (SPE) 138 initially having one or more electrolyte layers is placed on top of the top insulating layers (154T, 156T) and in physical and chemical connection to anode material 175 residing below it, in some embodiments. In alternative embodiments, the electrolyte can be placed over the substrate top 161 and the anode 175 top 176 or on the anode 175 material in the trench 150, while enabling the anode and electrolyte material to maintain close physical and chemical contact contributing to the high electrochemical performance capability observed in the current invention. The electrolyte 138 bottom 134 is physically and chemically attached and connected to the anode top 176. However, the electrospun polyacrylnitrile (PAN) separator 135 (in a preferred embodiment) enables electrical insulation between the anode or anode/electrolyte composite materials and the cathode or cathode/electrolyte composite materials and is saturated and surrounded on all sides by the Li-conductive polymer electrolyte. After current cycling (galvanostatic cell cycling) the composition and interface of the solid polymer electrolyte changes as described below.

Initially, in some preferred embodiments, the electrolyte 138 has one or more electrolyte components or layers (130B, 135, 120T). In preferred embodiments, the electrolyte 138 can be any known electrolyte material known in the prior art that is compatible with other materials in the device 100, including but not limited to liquid, semi-solid and solid-state electrolyte materials. (Note that in this disclosure the electrolyte 138 is sometimes referred to as a Solid Polymer Electrolyte (SPE) 138. This reference specifically applies to solid-state polymer electrolytes, but at times can be used to describe any solid-state electrolyte without loss of generality.)

In one preferred embodiment shown in FIG. 1, the electrolyte 138 comprises top 130T and bottom 130B layers 130 of a Lithium compound, e.g. a Lithium salt containing polymer compound immersed in a separator layer 135 of polyacrylnitrile (PAN) which provides electrical insulation between anode and cathode cell components. In preferred embodiments, the Lithium salt compound 130 is Lithium bis(trifluoromethanesulfonyl)imide (LiTFSi) salt electrolyte. Other materials 130 could be used including but not limited to lithium hexafluorophosphate, lithium perchlorate, lithium phosphate compounds, lithium bromide compounds, etc.

Initially, the electrolyte 138 has a thickness between 28 μm and 82 μm. However, thicknesses below or above this range are possible. They can be deposited by any of the following methods: polymer casting followed by PAN deposition and subsequent polymer casting or PAN lamination, calendaring, or adhesion to the top surface of electrode material (e.g., anode 175 or cathode 180) followed by deposition of polymer electrolyte onto the opposing electrode material and subsequent immersion of PAN-attached electrode material or through independent fabrication of the polymer/PAN/polymer material 138 with suitable trench-fitting dimensions followed by deposition of the electrolyte 138 into the trench and in contact with the bottom electrode already residing in the trench followed by heat treatment between 30 C and 80 C, however other temperatures are possible below and above this range.

In preferred embodiments note that there are not defined thicknesses for the "top" or "bottom" polymer electrolyte materials. These materials saturate the fiber-woven PAN such that polymer material is coating everything in and above and below the PAN. In these embodiments the thickness of polymer above and below the PAN is undetermined. Instead, we should characterize the thickness as the entire thickness of the electrolyte 138. "Top" or "bottom" may be used to describe where the electrolyte 138 interfaces with other battery components, e.g. the cathode 180 and anode 175.

The middle layer 135 can be made of any of the following materials: polyacrylnitrile (PAN), polyethylene, polypropylene, and any combination of suitable mixtures (e.g., polyethylene-polypropylene.)

Again, the composition and interfaces of the electrolyte 138 change after the current cycling (galvanostatic cell cycling) as described below.

A cathode, e.g. layers 180 and 185, with a cathode bottom 181 and a cathode top 186, is disposed on the top 136 of the electrolyte 138. The cathode bottom 181 is physically, electrically, and chemically attached to the electrolyte top 136.

The cathode (180, 185) can comprise any known cathode material (Lithium cathode composition) and structure known in the art as long as the cathode is electrochemically compatible with other components of the device 100.

In a preferred embodiment, the cathode (180, 185) comprises a conductive layer 185 with a Lithium compound layer 180. In preferred embodiments, the cathode Lithium compound layer 180 is Lithium Iron Phosphate (LFP) with a preferred layer thickness between 15 µm and 45 µm. A preferred conductive layer 185 comprises aluminum or an aluminum-based alloy 185 with a thickness between 8 µm and 50 µm. It should be known that other thicknesses of both Lithium Compound layer 180 and conductive layer 185 are possible. Other materials for the Lithium compound layer 180 include: Lithium Cobalt Oxide (LCO), lithium manganese oxide (LiMn2O4) (LMO), Lithium Manganese Oxyflouride (Li2MnO2F), lithium nickel manganese cobalt oxide (LiNiMnCoO2) (NMC), lithium manganese nickel oxide (LiMn1.5Ni0.5O4), lithium iron phosphate (LiFePO4), lithium iron manganese phosphate (LiFeMnPO4), lithium nickel cobalt aluminum oxide (LiNiCoAlO2) (NCA), carbon-substrate based catholytes, carbon/silicon composite catholytes, or any other cathode type material which is electrochemically and mechanically compatible with the energy storage device 100 presented herein. Other materials for the cathode conductive layer 185 include: nickel, titanium, aluminum alloys, etc.

The cathode layers (180, 185) can be deposited using known techniques including: wet material deposition (e.g., slurry deposition via nano or micropipette, slurry casting, doctor blading, or any other suitable method of depositing "wet" active electrode materials) with some form of laminating/pressure-roller/binding process which enables intimate, low resistance contact between the two cathode layer (180, 185) or dry material deposition (e.g., Vacuum deposition techniques such as physical vapor deposition, atomic layer deposition, chemical vapor deposition, etc.) of one cathode layer 180 onto the other 185.

Further environmental isolation, containment and integrity for intimate battery layer contact of the device 100 is provided by casing structures (192, 194.) For example, a stainless-steel top coin cell casing 192 is attached 198 to the top of the device 100 making electrical contact with the cathode conductive layer 185. A stainless-steel bottom coin cell 194 casing is attached 199 to the bottom of the device 100 making electrical contact with the substrate 160 bottom 162 and optionally, the sides of the substrate.

It should be noted that any number of electrically conductive (e.g., Aluminum and/or stainless steel) metal spacers or springs can be utilized to maintain constant mechanical pressure throughout the In-Silicon coin cell. The casings (192, 194) are physically and electrically attached to their respective components in the device 100, including the spacer components, and provide further structure integrity and isolation and containment barriers for the device 100. Additionally, the casings (192, 194), the backside of the substrate 162 or the spacer/spring components can be physically and electrically, as well as chemically attached to their respective components in the device 100 through the use of a conductive adhesive material such as silver epoxy, silver adhesive paste or other conductive/adhesive promoting materials.

The casings (192, 194) are physically and electrically attached to their respective components in the device 100 and provide further structure integrity and isolation and containment barriers for the device 100. Additionally, the casings (192, 194) can be physically and electrically, as well as chemically attached, to their respective components in the device 100 through the use of a conductive adhesive material such as silver epoxy or silver adhesive paste.

Referring to FIG. 2A, a micro graph image 200 showing materials, layers, and interfaces at an anode interface region 190 over the full horizontal width 201 of the trench 150. Initially, an adhesive, e.g. PANI, was placed between the substrate 160 and the anode bottom 174. The adhesive had no Lithium compound mixed in. After the structure 100 was completed, current was forced through the battery (galvanostatic cell cycling), cycling between a lower and a higher cell voltage as well as lower and higher applied current. During this cycling operation, the active region interface 190 is formed.

Note that FIGS. 2A, 2B, 2C, and 2D show the respective active region interfaces 190 after the galvanostatic cycling was completed. It is believed that the active region interfaces 190 were formed within the first 1 to 20 galvanostatic-controlled cycles of the full energy storage device. Once formed the active region interface structure lasts throughout the battery's higher performance lifetime and the structure may change or degrade upon capacity fade of the battery device.

The active region interface 190 shown in each of these figures can be a region 190 of one of multiple parallel microbatteries made on one substrate 160 as shown 295 in FIG. 2E. It should be known that a single microbattery can be made on a single substrate 160 and encased in the same manner as displayed in FIG. 2E. In this embodiment, the four microbatteries 295 were connected in parallel electrically before in cased 296 to make the final battery 297.

The micro graphs 200, 225, 250, and 275 were taken at battery life end.

FIG. 2B is a magnified 210 micro graph image 225 of part of the anode region interface 190 pertaining to the silicon/PANI/Graphite materials interface, shown in FIG. 2A within the dashed box region. FIG. 2B reveals that the active region interface 190 is a complex region with several layers. From bottom up, there is the silicon base or substrate 160, an electrically polarized base of the trench or trench bottom (more specifically the bottom component of the electrically polarized silicon area 173 of the bi-layer 230, 240), an electrically polarized, Silicon-based interphase layer 230 which is also part of the trench bottom and, a small non-smooth layer 235, (235 is possibly PANI that, in this embodiment, does contain Lithium metal or Lithium salt—hence creating a poor-Li-conduction layer and preventing mobile transport of Li$^+$ during current cycling. Consequently, this results in poor adhesion of the in-situ formed, Lithium metal layer 240—where poor adhesion between the in-situ formed Li-metal layer 240 and Silicon-based interphase layer 230 (the in-situ created bi-layer 230, 240) increases interfacial impedance during charge transport of the system—for examples, in transporting Li+ through the layer of adhesive, PANI 245, and the graphite anode 175 or electrical charge through the crystalline silicon substrate material 160—thereby resulting in a high impedance cell and poor charge storage performance. (In this micrograph 225, most of the graphite anode 175 is physically above the micro graph shown 225.) The poor adhesion between the in-situ formed Li-metal layer/interphase/Silicon interface that results in high impedance of the overall cell also results in voids or gaps between the graphite portion of the composite anode formed in-situ.

Again, the active region interface 190 in FIG. 2B is composed of non-Li-salt containing adhesive (e.g. PANI) at the trench bottom 173 between the anode bottom 174 and the substrate 160 prior to the current cycling created the active region interface 190. The following observations are made from inspecting the micro graph image 225:

1. the silicon substrate 160 is poorly Lithiated. There is not much Lithium (white dotted regions in the substrate 160) distributed within the substrate 160 and it is non-uniformly distributed—hence the conductivity for Lithium transport into the silicon substrate is poor and consequently the respective charge transfer resistance related to this phenomenon is high in magnitude.
2. The interphase layer 230 is thick, e.g. 205 nm thick—which illustrates a relatively high magnitude of polarization and/or charge transfer resistance when trying to transport electrons from the silicon material towards and/or into the PANI/Graphite region during galvanostatic cycling and consequently, the PANI/Li-metal/PANI/Graphite (albeit with void regions between PANI and graphite) region upon initial current cycling.
3. There is a small layer 235 formed between the interphase layer 230 and the metallic Lithium layer 240. It is believed this layer reduces adhesion and increases internal battery resistance. It is also believed that this layer is non-Li$^+$ containing PANI or low Li$^+$ concentrated containing PANI, where the Li-conductivity is too low within the PANI material to enable further growth of the Li-metal layer and consequently better adhesion between the Li-metal and the silicon substrate. Hence, the poor Lithium conductivity of the PANI material during current cycling is observed as the cause for poor in-situ formation of composite anode material which results in high charge transfer resistance and poor overall cell performance.
4. There is a layer of metallic Lithium 240 about 33 nm thick, but it is not flat and is uneven in thickness. The uneven planarity of the Li-metal layer is also thought to be a consequence of the poor-Lithium conductive PANI layer during current cycling described above.
5. There is a layer of PANI 245 above the layer of metallic Lithium 240 that is over 200 nm thick, not uniform in thickness, not flat, and not well mixed with the anode 175 graphite—as a large void is observed above the PANI layer and no consistently dark or progressively darker region is observed (assumingly due to the presence of low graphite concentration). In fact, the region above the PANI 245 is not homogeneous and seems to have little anode material.

When Lithium combines with silicon, there is approximately a 4:1 expansion of volume of the mixture and a commensurate decrease in volume when the Lithium leaves. This cycling in volume of the substrate 160 eventually causes stress failures in the substrate 160 which leads to failed structural integrity, higher internal resistance, leakage, entrance of contaminants, and shorter battery lifetime. However, in the present invention 100, the formation of even the non-uniform Li-metal layer during current cycling suppresses the transfer of Li-metal into and out of the silicon substrate—as no cracking, or structure breaking or mechanical breakdown is observed in FIGS. 2A and 2B. However, even though this structure prevents the cell-failure mechanism of silicon/Li-metal mechanical breakdown, the voids observed at the Si/L-metal interface and resulting high cell impedance prevent the energy storage device from reaching its full performance potential. Hence, a remedy is required to create a seamless Silicon/Li-metal layer which can reversibly store Li-based charge in Silicon material without quick mechanical breakdown due to well known silicon electrode failure mechanism due to the roughly 4:1 volume expansion/contraction of lithiated and de-lithiated silicon material, respectfully. FIG. 2C is a micro graph image 250 showing materials, layers, and interfaces at the active region interface 190 with a substrate 160 (over the full trench width 201) with a Lithium compound mixed in with a conductive polymer adhesive and, in a novel way, placed between the anode bottom 174 and the substrate 160 before the active region interface 190 is formed by galvanostatic current cycling 1300. The anode 175, anode bottom 174, and substrate 160 are shown.

FIG. 2D is magnified 211 micro graph image 275 of part of the anode region interface 190 pertaining to the silicon/Li-Containing PANI/Graphite materials interface, shown in FIG. 2C within the dashed box region. The substrate 160, an electrically polarized trench bottom 173, an electrically polarized interphase layer 230, metallic Lithium layer 240 and the bottom of the graphite anode component, composited with Li-salt containing PANI, 175 are shown.

Again, the active region interface 190 in FIG. 2D, in a novel way, had adhesive (e.g. PANI) mixed with a Lithium compound, e.g. LiTFSi (a lithium salt electrolyte), placed at the trench bottom between the anode bottom 174 and the substrate 160, prior to galvanostatic current cycling 1300 which consequently enabled the creation of the active region interface 190 during the galvanostatic current cycling 1300. The following observations are made from inspecting the micro graph image 275:

1. the silicon substrate 160 is well Lithiated. Lithium material is diffused uniformly though out the substrate 160 in this part of the active region interface 190 as shown by the "greyish" and white/grey intermixed color of the substrate 160. There is concentrated homogeneity throughout the portion of the substrate which allows for an electrical connection between the silicon substrate 160 and the trench-filled battery materials (e.g., 175), up to a certain depth within the substrate below the base of the 3D silicon trench. The concentration of Lithium gradually decreases moving into the substrate 160A in a direction away from the interphase 230. In preferred embodiments, regions of the substrate 160A are saturated with Lithium ions above 0.001% by weight of the substrate.

It is noted that in this non-limiting example, only the center 500 square microns of the trench base have had the insulating layer(s) eliminated (e.g., via RIE or etching methods) so therefore this is where the bulk of the Lithium observed in the Silicon should and does reside. This is why FIG. 2C illustrates the majority of the lithiated silicon in or near the center of the trench-base.

2. The interphase layer 230 is thin, e.g. 21.9 nm thick, nearly 10 times thinner than the interphase layer 230 in FIG. 2B. This reduces resistance to ionic and electron current flow and thus enables higher theoretical performance of the overall energy storage device. Additionally, the thinner interphase layer enables a more consistently smooth, planarized layer as the lithium metal layer forms on its surface during galvanostatic cycling.
3. There are no extraneous layers formed—especially between the Li-metal layer and the silicon base of trench.
4. There is a layer of metallic Lithium 240 about 30.5 nm thick, that is flat and even in thickness—which illustrates excellent adhesion between the in-situ formed Li-metal layer and the base-of-trench/in-situ formed interphase layer 230. There is no extraneous layer and no voids or spatial gaps between Li-metal and Silicon based interphase layers 230.
5. The composite anode bottom 174 formed after galvanostatic current cycling 1300 is homogeneous being a uniform mixture of graphite, LiTFSI containing PANI, which is well adhered to a Li-metal 240/Silicon-based interphase 230 bilayer. There are no separated layers in the anode bottom 174 and the anode bottom uniformly transitions to the graphite material above in the in-situ formed composite anode 175.

It is believed that the uniformity, homogeneity, and good mixing of materials in the bottom of the anode 175 in structure 275 causes good adhesion, which creates a high functioning ionic and electric conducting bilayer system—that enables good containment of Lithium or high control of Lithium mass transport, and therefore reduces structural failures when the volume expansion and or compression of silicon material during lithiation/de-lithiation processes ensue. Further, it is believed that the increased conductivity of the uniform composite material formed in-situ (discussed more below) permitted a thinner interphase layer 230 with less resistance to both electron and ion transport, which, mainly due to the Li-containing nature of the PANI additive material before the current cycling 1300, consequently permitted the formation of a well adhered, smooth, robust Li-metal layer 240 in-parallel with the formation of the Silicon-based interphase layer 230 during the galvanostatic current cycling 1300 of the full energy storage device. The uniform thickness and excellent void-free adhesion of the metallic Lithium layer 240 increases both the electrical and Li-ionic conductivity of the silicon substrate—enabling the relatively low interfacial charge transfer resistance and overall low impedance of the full cell relative to the electrochemical performance of the cell shown in FIGS. 2A and 2B. Additionally, once the Li-metal layer 240 attains sufficient thickness (such as the thickness (30.5 nm) shown in FIG. 2D obtained in the discharged state of a high performance cell) the Silicon-based interphase 230/Li-metal bilayer 240 (together referred to a bi-layer) prevents magnitudes of mass transfer of Li-ions into the bulk of the Silicon substrate 160A which would irreversibly damage or disable the reversible-charge storing composite electrode system. It is thought that the percent by weight concentration of Lithium ions varies no more than 10 percent during the cell operation (e.g. when a current greater than 1 nanoampere (nA) is imposed through the composition) in the silicon substrate, once the bi-layer (230, 240) is formed. This is concluded based on the fact that the silicon substrate bulk 160 is highly lithiated yet shows no sign of degradation or mechanical breakdown. Hence, enough Lithium material is allowed to cross into the silicon bulk but the total concentration of the lithium material which is integrated with the silicon bulk is minimized—resulting in no mechanical breakdown and sustainable rechargeable cell cycling. Further, it is believed that the main mechanism of charge storage in the composite anode results from both plating type mechanisms on the Li-metal layer 240 which is formed on top of the silicon-based interphase 230 as well as intercalation of Lithium ions into the graphite anode material. Therefore, the stresses from changes in the volume of the substrate 160 materials are reduced and structure lifetime improves.

As described above, the lower conductivity of the PANI only material used in FIGS. 2A and 2B create a higher resistance to ion and electron transport during galvanostatic cycling—as shown with the voids and spatial gaps between the silicon-based interphase layer and the Li-metal layer in FIG. 2B. Since the resistance to transfer charge across the silicon/PANI bilayer is higher, the polarization resistance of the silicon in contact with the PANI is higher compared with the Li-compound containing PANI—resulting in a thicker Silicon-based interphase layer.

The opposite processes are observed when the Li-compound containing PANI is used prior to current cycling 1300 as shown in FIGS. 2C and 2D—which result in a thin, smooth, robust Li-metal layer 240 well adhered to a thin (~10× thinner than FIG. 2B) silicon-based interphase layer 230. Hence the addition of Li salt compound to the PANI additive layer enables a high functioning in-situ formed composite anode during current cycling 1300 and a high performance resulting full energy storage device.

To continue, the prior art generally does not use crystalline silicon as an anode or substrate base 160, but instead uses a pulverized silicon powder material, where conductive additives are utilized to increase cell performance (e.g. a core shell type carbon wrapped silicon-based particles). The novel use of crystalline silicon substrates 160 in this configuration (250, 275) enables a uniquely strong interphase region which is formed in-situ during electrochemical cycling, i.e. the Lithium metal layer 240 combined with the interphase layer 230, act as a well-formed and well-adhering mechanical/chemical/electrical cap to prevent too much Lithium from cycling in and out of the silicon base 160, as well as a mechanical layer which prevents cell failure due to it's ability to "cap" or mechanically and physically contain and/or maintain the crystalline silicon structure (which expands and contracts up to 400% in volume during lithium transfer processes) which resides below the bilayer 160, and hence provides low resistance electrical/ionic connection which promotes the lifetime and electrochemical performance of the energy storage device—thereby making viable use of crystalline silicon as a microbattery substrate (160, 160A), and in parallel, as a potential microelectronic device substrate.

Using disclosed methods and materials helps enable a solid-state bi-layer formed in-situ on a 3D patterned crystalline silicon material, which enables a high functioning full energy storage device yielding: low-interfacial impedance, a combined Li-plating and Li-ion/graphite intercalation composite anode charge storage mechanism, and conclusively, a Li-metal/Silicon-based Interphase bi-layer (230, 240) that prevents the mechanical breakdown of Lithiated Silicon anode material and promotes long-lasting reversible charge storage performance of the energy storage device.

In one embodiment, the initial galvanostatic cycles maintain a relatively low working voltage limit, e.g. 15 mV to 150 mV, at which time Lithium ions form Li-metal at the base of silicon trench and "plates," e.g. saturates, the silicon substrate 160, while also being transported into the base silicon substrate 160 which, in parallel, forms the above described bi-layer. In parallel to this phenomenon, the silicon-base interphase is formed directly below the Li-metal plated layer, as electrons are polarized at the silicon side of the silicon/Li-metal interface as they are electrochemically attempting to combine with Lithium ions to form Lithium metal. As this polarization process occurs, a polarization resistance to electron flow is observed, as electrons are "bottle-necked" at the top surface of the base of the 3D silicon trench. This polarization region results in the silicon-based interphase 230. The degree of ease by which electrons from the silicon substrate 160 can combine with Li-ions in the PANI material 170, 170B, primarily determines the thickness of the observed interphase layer—where thickness increases with the frequency or magnitude of spatial voids between the in-situ formed Li-metal layer and the silicon-based interphase.

Upon formation of the composite anode material containing the silicon based interphase/Li-metal bilayer (230, 240), the lower voltage limit can be increased upon subsequent galvanostatic reversible cycling 1300 where Li-based charge is stored at the composite anode in the form of: 1) plating a thicker Li-metal layer 240 on top of the silicon-based interphase layer 230 and 2) intercalation type charge storage with graphite portions of the composite anode and
3) Lithium-Silicon coordinated/alloy-based charge storage—as embodied by the small amount of Li-charge which can irreversibly and/or reversibly translate into and/or into/out-of the silicon substrate residing below the 3D Silicon trench base.

Lithium ions are supplied from the cathode and the magnitude and/or thickness of additional Li-metal plated on the pre-plated Li-metal layer 240 is dependent on the working voltage range (e.g., lower working voltage limit results in more/thicker plated Li-metal), and coordinated Lithium-Silicon based charge storage.

Upon reversing the polarization of the galvanostatic current cycling 1300, Li-ions form from the thicker plated Lithium metal in combination with Li-ions being released from graphite components of the composite anode—where these Li-ions travel through the electrolyte and are intercalated or electrochemically hosted in the cathode. The Lithium ions entering the Lithium metal layer 240 from the substrate 160, upon reverse of the initial applied current (or upon discharge of lithium from the composite anode), take electrons from the top silicon region of the substrate 160. The interphase layer 230 forms at the base of the silicon substrate 160 3D trench due to the polarization resistance which results from formation of the initial plated Li-metal layer; where the resulting interphase layer 230 is most-likely composed of electron-deficient and Li-ion hosting/transport-capable silicon-based material.

As a result of the current cycling 1300, this electron deficient/Li-ion transport-capable interphase layer in combination with the Lithium metal layer 240 create an bi-layer (230, 240) at the base of the 3D silicon trench which results in low-interfacial composite anode impedance, a combined Li-plating and Li-ion/graphite intercalation composite anode charge storage mechanism, and conclusively, a Li-metal/Silicon-based Interphase bi-layer that prevents the mechanical breakdown of Lithiated Silicon anode material through mitigating the magnitude of Lithium ions allowed to cross the silicon-based interphase/Li-metal bilayer after initial cycling. Hence, after the bi-layer is formed, the majority of the Lithium ion exchange in the battery is occurring in the (graphite) anode 175 in combination with additional plating on and stripping from the Lithium metal layer 240.

Note that while the fully formed bi-layer (230, 240) largely prevents the free conductive transport of Lithium ions from the cathode (180, 185) to the silicon substrate 160, Lithium ions still migrate from the cathode (180, 185) through the electrolyte (130, 135) onto the Lithium metal layer 240, now formed, as well as the graphite anode material 175, which is now part of the composite Silicon/Silicon-based Interphase/Li-metal/Li-containing PANI/Graphite Anode 1475. In the Lithium metal layer 240, the Lithium ions combine with electrons from the base substrate 160 that migrate through the interphase layer 230. Lithium ions combining with electrons form Lithium metal that adds to the mass of the Lithium metal layer 240 when the battery 100 is charging. The reverse process happens on discharge of the battery.

Further, the active region interface 190 (particularly the bi-layer) acts as a containment layer which is created at the trench bottom 173. This trench bottom 173 in conjunction with the insulating layers (154, 156) seal the trench 150 cavity on 5 sides—where only the bottom portion of the trench 173 allows for an electrical connection between Li-ions and electrons. Due to the base-of-trench containment layer's (bi-layer) ability to largely suppress Li-ion transport into and out of the crystalline silicon bulk 160, volume expansion/compression in the substrate 160 which is induced during charge/discharge cycles, respectively, are greatly reduced, adding to the reliability, sustainable reversibility and lifetime of the battery.

Battery electrical parameter improvements are described further below after a discussion about the mixture, use, and transition and alternative compositions of matter including a conductive adhesive and a Lithium compound.

In a preferred embodiment, a Lithium salt compound is mixed with conductive adhesive material and doping material.

The Lithium salt compound is comprised of any one or more of the following: lithium hexafluorophosphate, lithium perchlorate, lithium trifluoromethanesulfonate, trifluoromethanesulfinimide lithium salt, Lithium bis(trifluoromethanesulfonyl)imide, lithium fluoride, lithium iodide, lithium bromide, etc. In one preferred embodiment, the Lithium salt compound is LiTFSI.

The lithium salt compound comprises between 2 to 50% by mass of the complete lithium compound, conductive adhesive and doping material mixture. In a preferred embodiment, the lithium salt compound comprises 37% plus or minus 2% by mass.

In a preferred embodiment, the adhesive has to be conductive and adhesion promoting for silicon, graphite/carbon-based materials, and polymer-based materials. In some embodiments, the adhesive is a polymer. In preferred embodiments, the conductive adhesive comprises any one or more of the following: polypyrrol, polythiophene, polyaniline, polyphenylene sulfide, etc. In a preferred embodiment, the conductive adhesive is PANI. Percentage by mass of the PANI in the conductive adhesive mixture can range from 20% to 85% but more preferably, between 30% and 60% by mass.

In preferred embodiments, the doping material is an acid comprised of either a Lewis acid or protic acid like camphorsulfonic acid, toluenesulfonic acid, tetraflouroboric acid, trifluoromethanesulfonimide, etc. Percentage by mass of the doping material can range from between 1% to 25% by mass but more preferably, between 5% and 15% by mass.

In preferred embodiments, the mixture is mechanically stirred or sonicated (e.g. agitated with sound energy) for many hours, overnight or as needed until homogeneity is achieved. A high vapor pressure solvent may be added in some embodiment to promote homogeneity of the mixture. For example, an acetonitrile or hexafluoro-2-propanol may be used.

The completed mixture is pipetted, cast or spin coated into/onto the 3D silicon substrate trenches 160, with any excess material doctor bladed off of the substrate. The conductive adhesive mixture is then allowed to air dry and then is heated to between 60 C to 160 C for between 1 to 10 minutes and allowed to cool.

As described below, the mixture created when properly used and processed will provide the following non-limiting advantages in the energy storage device:

1) An electrical and Li-ion conductive medium which greatly adheres to anode material or anode mixtures such as silicon, carbon-based materials, graphite.
2) A medium which creates an electrochemically robust and low impedance interphase layer (bi-layer) for many rechargeable cycles, formed in-situ as the full cell is electrochemically cycled.
3) A solid electrolyte material which integrates into the composite anode material in an in-situ fashion, further lowering the impedance of the full cell.
4) A charge transfer resistance lower than 100 Ohms for the full cell. More ideally lower than 50 Ohms for the full cell. Even more ideally lower than 20 Ohms for the full cell.

By adjusting the formulation, e.g. by adjusting the percent weight of the Lithium salt in the mixture, of an interfacial additive, a thinner interphase was achieved with superior interlayer adhesion of an electrochemically tailored silicon/additive/anode composite.

In one preferred embodiment, the thinner interphase layer was created by depositing a novel composition material, a mixture of a conductive polymer adhesive (e.g. Polyaniline, PANI) and a Lithium compound (e.g., lithium trifluoromethanesulfonate, LiTFSI). In some preferred embodiments, the device is cycled one or more times by varying current through the device 1300 to form the active region interface 190 at the electrode (e.g. anode) and silicon substrate base where the cell is formed "in-situ".

Figure 3:
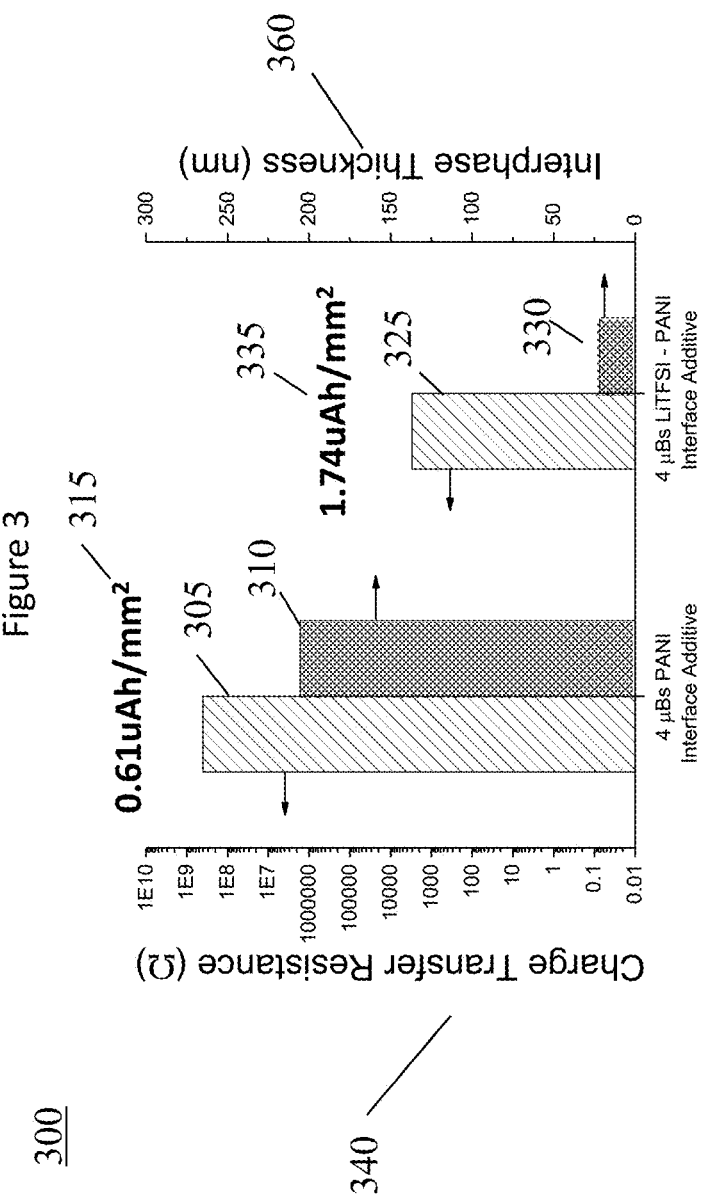
FIG. 3 is a bar graph showing a comparison of charge transfer resistance and interphase thickness and their respective resulting maximum discharge capacity (above bar plots)

Referring to FIG. 3, a bar graph 300 showing a comparison of charge transfer resistance 340 and interphase thickness 360 in each of the embodiments of i. FIG. 2A and FIG. 2B (305, 310) and ii. FIG. 2C and FIG. 2D (325, 330), respectively.

FIG. 3 shows the results for cells (4 parallel microbatteries, 4 µB) with only a PANI interface additive (no Lithium based compound) used in the 200 and 225 active region interface 190 are represented by the left bars (305, 310) while results for cells using the novel LiTFSI-PANI combination material in the 250 and 275 to form the active region interface 190 are the right bars (325, 330). The cells (made with PANI only (200, 225)) illustrated approximately a 10 times thicker interphase layer 230, poor composite anode adhesion, PANI-based Lithium metal/Silicon interlayer—creating voids 235 resulting in cell impedance induced poor performance (0.61 µAh/mm$^2$ maximum capacity, 315). The cells (250, 275) made using the novel LiTFSI-PANI material composition had a 10 times thinner interphase layer 230, great composite anode adhesion (no PANI-based creation of high impedance inducing interface voids), and high capacity performance (1.74 µAh/mm$^2$ maximum capacity, 335).

The composite cells (four parallel microbatteries—4 µB) on one substrate electrically connected in parallel 295, as described above and below) made with the novel Lithium compound containing PANI were compared with similar composite cells 295 made with a non-Lithium compound containing PANI layer as an interfacial additive. The composite cells made with the novel Lithium compound containing PANI as an additive displayed a charge transfer resistance 5 orders of magnitude lower 325 with 2.8 times greater areal discharge capacity (1.74 uAh/mm$^2$) 325 than the other composite cells with no Lithium compound additive 305. The composite cells made with the PANI with a Lithium compound additive lasted 60 rechargeable cycles with an average discharge working voltage range of 2.5V to 1.0V, with working voltage cutoffs as low as 10 mV and high as 4.7V.

Further, the composite cells made with the novel Lithium compound containing PANI composition had an interphase 230 thickness 330 of about 22 nm compared to an interphase 230 thickness 310 of about 205 nm for similar composite cells made with a PANI layer with no Lithium compound as an interfacial additive, when current cycling 1300 the cell with the lowest cutoff voltages being 15 mV and the highest voltage being 4.7V, where sets of various working voltage limits (1.2V, 2.7V, 3.6V, 4.0V, 4.2V, 4.5V, 4.7V) were utilized over 100 reversible cycles. See FIG. 5A.

Also, test modules consisting of only a single, standalone, approximately 2.6 mm$^2$ packaging area In-silicon microbatteries measured a full cell charge transfer interfacial impedance less than 120Ω at the pre-cycle stage with the lowest interfacial impedance observed after more than 80 current cycles (less than 50Ω) when made from the PANI with a Lithium compound additive.

As described in more detail below, the novel composite anode formation was modeled by in-situ Electrochemical Impedance Spectroscopy (EIS) measurements and showed a reduction in interfacial impedance between i. graphite/LiTFSI-PANI/Lithium metal/Silicon-based interphase layer/crystalline silicon in the anode (175, 1475) and ii. in the Lithium ion conductive electrolyte plasticizer succinonitrile (SN), its respective capabilities to increase discharge capacity upon progressive cycling through a mechanism based on concurrently progressive electrochemical double charge layer (EDCL) charge storage saturation of electrode particles and materials, and the structural polymer component, Polycaprolatone (PCL), composition in the electrolyte (130, 135) throughout extended electrochemical cycling operations.

Figure 4B:
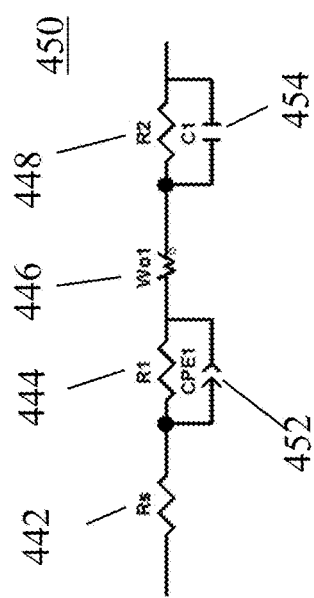
FIG. 4B is a diagram of an RC model for the 0 current cycle case.
Figure 4C:
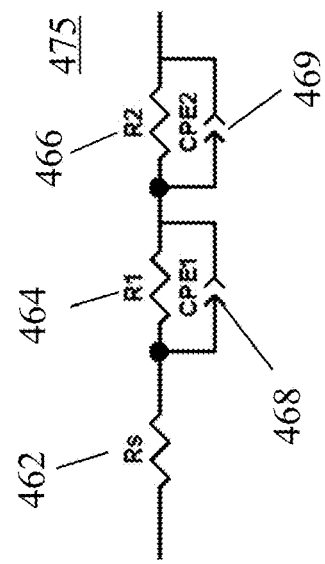
FIG. 4C is a diagram of an RC model for the greater than 80 current cycle case.
Figure 4A:
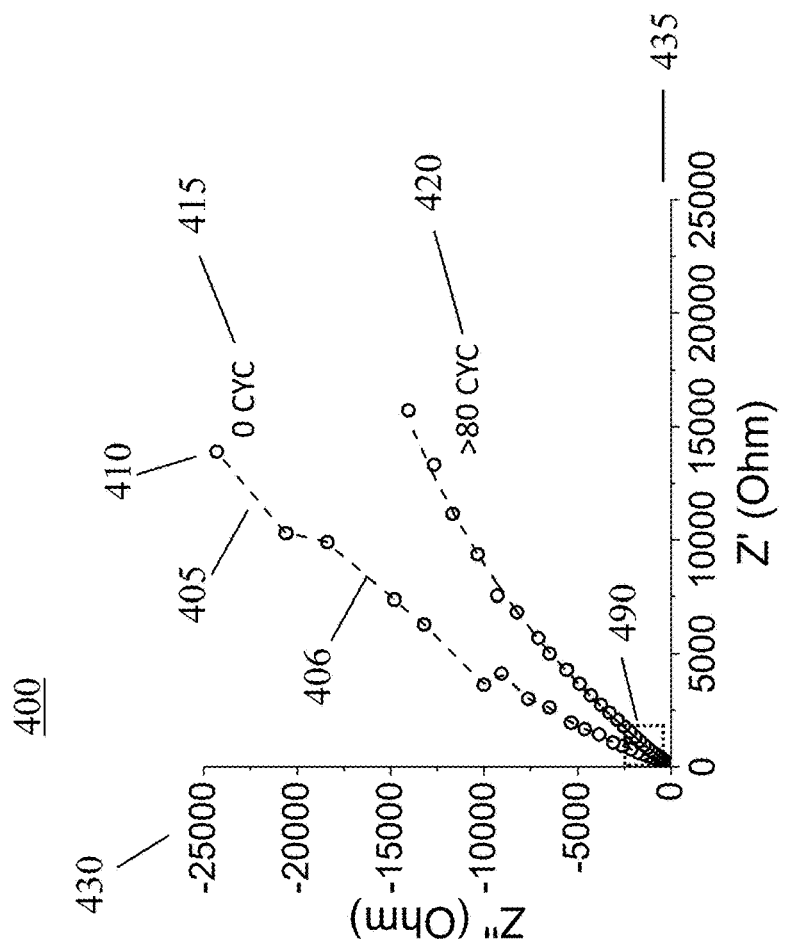
FIG. 4A is a Nyquist plot, between 1 MHz and 200 mHz and an applied amplitude of 50 mV, of a single In-Silicon microbattery taken at 0 current cycles and greater than 80 current cycles.

FIG. 4A are two Nyquist plots 400 of a single in-silicon microbattery within coin cell type encapsulation with one Nyquist plot taken at 0 current cycles and another Nyquist plot taken at greater than 80 current cycles.

A Nyquist plot is a graph used in Electrochemical Impedance Spectroscopy (EIS) that plots the real part of a battery impedance (associated with real cell resistance) on the X-axis 435 and the imaginary part (associated with cell capacitance) of the battery impedance on the Y-axis 430 over a range of frequencies, e.g. each point 410 (typically) on the Nyquist plot is one given frequency. The lower frequencies are on the right side of the graph (X-axis) and higher frequencies are on the left (of the X-axis) and the Y-axis 430 shows negative values of the imaginary part of the impedance.

The Nyquist plot in FIG. 4A shows the impedance plots for a single cell (one trench 150) microbattery within a coin cell encapsulation: i. before any current cycling occurs (top curve, 415) and therefore before the active region interface 190 is created and ii. after more than 80 current cycles (bottom curve 420), after the active region interface 190 is created. The "circle" points 410 (typically) on each curve are actual measured values at a given frequency and the dashed line 405 (typically) are the calculated values from a best fit RC model, e.g. 450 and 475, respectively.

FIG. 4B is the best fit RC model 450 for the data points for the "0 cycle" curve 415 and FIG. 4C shows the best fit RC model 475 for the data points on the ">80 cycle" curve 420.

The frequency measurements varied from 1 megahertz to 100 millihertz.

The graphs show that over the entire frequency range, the imaginary part of the impedance decreases after formation of the active region interface 190, i.e. the imaginary part of the battery impedance is lower on curve 420 than on curve 415 for every frequency measurement.

The difference in the two curves (415, 420) shows the impedance change of the battery as the structures, layers, and chemical composition of materials within the single In-silicon microbattery are changed, in-situ, as the cell is cycled due to the application of galvanostatic cycling through the battery cell for at least 80 cycles to form the final anode 175 and active region interface 190 as well as changes in the electrolyte (130, 135.)

FIG. 4B is a diagram of an RC model 450 for the 0 current cycle case. The model 450 comprise a series or ohmic associated resistance, $R_s$ 442; in series with a parallel combination of a resistor, R1 444 and constant phase element associated impedance 452; in series with a "Warburg impedance, $W_{o1}$ 446; and in series with a parallel combination of resistor, R2 448 and impedance 454 which is thought to represent the both the interface and composition of the cathode combined with the bulk impedance due to the electrolyte material.

Generally, in EIS analysis, $R_s$ 442 is measured/estimated as the real part of the impedance at the higher or highest frequency data point of the Nyquist plot. $R_s$ 442 is a pure resistive component between the electrodes of the battery and in batteries with liquid electrolyte can be related to the solution resistance of the electrolyte.

The parallel combination of a resistor, R1 444 and constant phase element (CPE) 452 is thought to be the electrical model of the active anode region and associated interface(s) 190. R1 444 is a pure resistive element while impedance 452, CPE 1 (CPE, constant phase element) is a combination of both resistive and constant phase associated imaginary component. The combination of R1 444 and CPE 1 (452) adds an RC time constant to the circuit model 450 that exists even before the active region interface 190 forms.

Generally, in EIS analysis of cells with high performing ion diffusion, electrode/electrolyte interface ion transport processes and/or mass transport (electrolyte migration) associated with the electrolyte (130, 135), the Warburg impedance 446 measurement frequency component of the cell is observed as a near 45 degree "straight, diagonal" section of the Nyquist plot, e.g. 415, 446.

The parallel combination of a resistor, R2 448 and capacitor 454 is thought to be the electrical model of the cathode interface with the electrolyte and the electrolyte bulk. The combination adds a second RC time constant to the circuit model 450-405, 406 and 410 relate to this RC combination.

FIG. 4C is a diagram of an RC model 475 for the greater than 80 current cycle case 420, i.e., after the active region interface 190 is formed.

Inspection of the model 475 reveals that the Warburg impedance 446 is gone. This contributes to the overall reduction in impedance across the battery after formation of the active region interface 190. The responsible frequency range of the associated Warburg impedance modeled at 0 cycles 446 is thought to be comprised of relatively few independent frequency data points in the high to mid frequency range only (e.g. 1250 Hz to 500 Hz) as now highlighted in FIG. 5. This also indicates that the disappearance of the Warburg impedance between 0 cycles and greater than 80 cycles is due to an alteration or chemical and physical change in the anode/electrolyte interface—as the anode region associated with the composite anode charge transfer region are measured at frequencies directly higher in magnitude than the frequencies of the Warburg impedance (e.g. 1250 Hz to 500 Hz).

The characteristics at the interface between the cathode and electrolyte, as well as the bulk resistive properties of the electrolyte, also change as modeled by the change from capacitor element C1 454 in model 450 to a constant phase element (CPE2) 469 in model 475, e.g. the element 469 now has a complex impedance associated with both an imaginary (capacitance) and real (resistance) components upon extended cycling. Such a transformation correlates with the change in both the mass transfer resistance associated with ion transport in the electrolyte as well as a change in the chemical structure associated with the electrolyte/cathode interface and the resulting impedance to transfer charge through or across such interface.

In addition, upon cycling more than 80 times, there was a decrease in the value of R1 464, the resistance to transfer of charge across the active composite anode region 175A including the transition region 172 and the bi-layer region and including lithiated base silicon substrate 160A.

The table below is a non-limiting summary of some of the changes that occur in the novel battery electro-chemistry due to the current cycling 1300 to decrease charge transfer resistance of the composite anode region as well as the elimination of the Warburg type impedance which is observed due to the impedance of transferring charge from anode region prior to cycling and prior to composite anode formation. Hence, as the full cell is cycled repetitively, the formation of the composite anode (Si/Si-based Interphase/Li-metal/LiTFSI-PANI/Graphite) 1475 increases the conductivity of Li-ion transport for the overall full cell.

Figure 5:
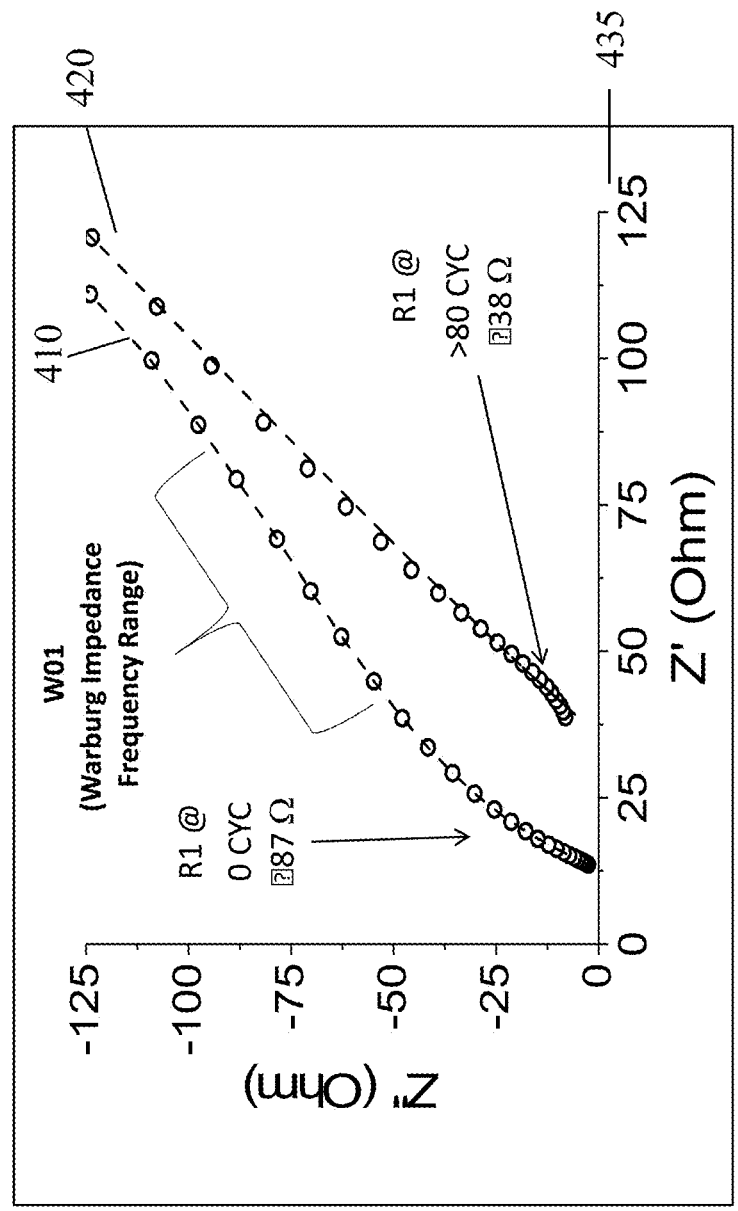
FIG. 5 is a magnified region illustrating the high and mid frequency regions of the Nyquist plot shown in FIG. 4A.

Region 490 of the Nyquist plot 400 is magnified and shown in more detail in FIG. 5.

FIG. 5 is a magnified region 490 of the Nyquist plot shown in FIG. 4A and will be used to determine the values of R1 444 before and after the formation of the active area interface 190. The experimental data points are the hollow circle points in the plot where the dashed line is the theoretical model fits (450, 475) of the experimental data points. It should be noted that from the Nyquist plots shown in FIG. 5, one can observe a partial semicircle due to the R1/CPE1 parallel combination of the cell at 0 cycles associated with the pre-cycled composite anode region. Upon more than 80 reversible cycles, the Nyquist plot associated with the cell changes significantly, where a much smaller portion of the associated semicircle is observable.

Upon more than 80 reversible cycles, the semicircle approximation of the R1 (464)/CPE1 (468) visually yield an elongated-type semicircle—due to the in-situ formation of the composite anode material. Through the high-to-mid frequency semicircle approximation illustrated for 420 by the fitted model of best fit, it is apparent that higher frequency regions become active (not shown experimentally since both 410 and 420 were measured with the same frequency range 1 MHz to 100 mHz) due to the in-situ composite anode formation. More specifically, it is believed that the formation of the Si-based Interphase 230 and Li-metal 240 bilayer is responsible for the additional higher frequency associated changes in the magnified region of the Nyquist plot 420 and the resulting elongated constant phase element which represents the R1 (464)/CPE1 (468) modeled semicircle. The point of origin of the approximated semicircle (leftmost X-intercept) is approximately the same as the pre-cycled Nyquist plot 410, thereby further validating the semicircle approximation as the resulting Rs (Ohmic/Series resistance) of the >80 cycle Nyquist plot 420 is approximately the same (~15Ω) as the pre-cycled Nyquist plot 410. The relative dimensions, location and magnitude of the said post-80 cycles semicircle is affirmed by the value of R1@>80 cycles as calculated by the RC circuit model of FIG. 4C, where the diameter of the semicircle is aligned with the X-axis 435 and the length of the diameter gives the value of R1 444.

As shown, the value of R1 444 in model 450 is 87Ω at zero current cycles and before formation of the active region interface 190. The value of R1 464 in model 475 is 38Ω above 80 current cycles and after in-situ formation of the active composite anode region interface 190. The resistance R1 has decreased 56% as a result of the formation of the novel in-situ composite anode active region interface 190 which enables higher conductivity of Lithium ions and lower resistance to transfer charge across the composite anode region.

The table below lists some of the non-limiting improvements to the electro-chemistry and performance of the novel battery 100 with a novel active region interface 190.

Some Impacts on Charge Transfer Resistance from Composite Anode Formation

| Key | 0→80 Current Cycles | Impact |
| --- | --- | --- |
| R1: Anode Ω | 56% decrease | Formation of Low Ω Si/Si-based Interphase/Lithiated Si/PANI/Graphite Composite Anode 172 |
| WoI: Mass Transfer Ω | Decrease from 2.7 Ω to 0 Ω | Mass Transfer Resistance associated with Anode to Polymer Electrolyte Ω Eliminated Upon Composite Anode Formation. |

Figure 5A:
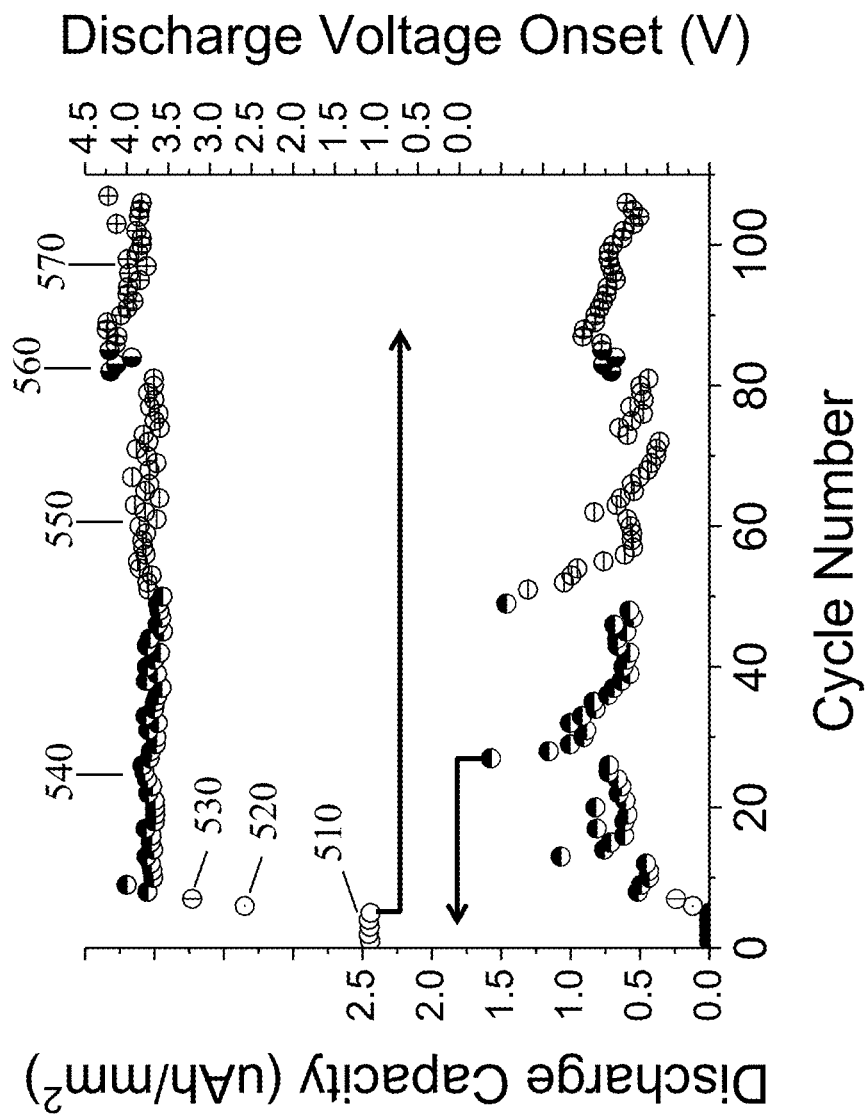
FIG. 5A is a graph showing discharge capacity (in μAh/mm$^2$) and the initial voltage observed when applying current during discharge cycling (in volts) vs the respective electrochemically rechargeable cycle.

FIG. 5A shows one stand-alone energy storage device test module showing discharge capacity with the data points in the bottom of the plot where the left side Y-axis illustrates discharge capacity for each cycle (in $\mu Ah/mm^2$) and discharge voltage onset with the data points on the top of the graph where the right side Y-axis illustrates discharge voltage onset (in volts) vs number of current cycles. Note that discharge voltage onset refers to the starting voltage immediately after galvanostatically discharging the cell (within the first second of applying cell discharge inducing current). This data was taken using one microbattery, i.e. one trench 150, on one substrate 160 encapsulated in a coin cell encapsulation (192, 194.)

The single microbattery yielded a top areal capacity greater than 1.50 uAh/mm$^2$ after operation, with more than 100 operational rechargeable cycles obtained with an average working voltage range of 3.5V to 1.0V (500); yet cycling the cell with the lowest cutoff voltages being 15 mV and the highest voltage being 4.7V, where sets of various working voltage upper limits were utilized throughout the more than 100 cycles of the cell: 1.2V 510, 2.7V 520, 3.6V 530, 4.0V 540, 4.2V 550, 4.5V 560, 4.7V 570. Minimum rechargeable capacities of these test modules (1 microbattery on a substrate 160) were double that of other (4 microbatteries 295 on a single substrate 160 electrically connected in parallel) and enabled an 18 times reduction in packaging area with nearly a 3 times reduction in composite cell impedance and consequently, a 1.2 volt increase of onset discharge voltage.

FIG. 5A illustrates the effect upon the rechargeable performance of the cell when applying the pre-cycling treatment. The initial cycling of the single microbattery cell yielded a low discharge onset voltage 510 and correspondingly, very low discharge capacity (bottom of plot data points directly below 510 data points). This cycle schedule only charged the cell to 1.2V prior to discharge. In fact, the impedance of the cell was typically too great at this stage in its lifetime to charge the cell to a higher voltage. The discharge voltage onset was in general approximately 1.0V, yet due to the relatively low discharge voltage onset virtually no capacity was yielded. At this point in the cell's lifetime, the composite anode material as well as the stable silicon-based interphase/lithium metal bilayer were in the preliminary stages of being created.

The next cycle utilizes an upper working voltage cell limit of 2.7V, where the time to charge the cell to this voltage was much higher than the previous cycles 510, as the resistance of the cell is decreasing when the cell upper voltage limit is progressively, incrementally increased. In this cycle, we observe a jump in discharge voltage onset to approximately 2.5V 520 and correspondingly, yields a discharge capacity of approximately 0.12 uAh/mm$^2$. The increase in magnitude of the upper working voltage limit, in this case, enabled the initial formation of the working composite anode containing the silicon-based interphase/Li-metal bilayer (230, 240.) Hence, because the composite anode and silicon interface have been formed, where the electrochemical pre-cycling treatments (510, 520) promote the intimate adhesion between composite layers which lowers the total impedance the cell experiences when galvanostatic current cycling 1300, the cell experiences a relatively significant increase in the ability to retain charge (maintain State of Charge (SOC)). Now, since the highly adhered composite layers are formed, current does not leak out of the active region of the cell with the direct result being a proportional lowering in voltage (leaking of charge) when trying to discharge the microbattery. At this point, the impedance of the cell is low enough to charge the cell to this voltage in a relatively low amount of time, and hence higher voltages can be employed.

The next cycle increases the working voltage upper limit even further to 3.6V, where even higher performance is observed in both the discharge onset voltage (~3.1V) as well as the discharge capacity (~0.20 uAh/mm$^2$). Hence, it is believed that the composite anode and essential silicon-based interphase/lithium metal bilayer is now even lower in its contributions to overall cell impedance.

The remaining (>90) cycles also had their upper working voltage limit progressively increased in independent cycle sets with magnitudes of: 4.0V 540, 4.2V 550, 4.5V 560, 4.7V 570, with all discharge voltage onset magnitudes revealing approximately 3.75V, 3.85V, 4.1V, 4.2V magnitudes, respectively, during their independent cycle set. At this point, the single microbattery has developed a sustainably functioning, low impedance composite anode containing a silicon-based interphase/lithium metal bilayer which enables very low charge transfer resistance (FIG. 5) of the energy storage device. Hence, once the composite anode containing a silicon-based interphase/lithium metal bilayer is fully formed after the first 3 pre-cycle stages, the entire cell can function like a high performance microbattery maintaining high SOC upon charging (low leakage=little to no drop in discharge voltage onset potential magnitude from cycle to cycle).

In summary, FIG. 5A illustrates the cycling performance results which are impacted by and during the formation of the composite anode containing the Si-based interphase/Lithium bilayer 230, 240.) The progressive increase in the cell's ability to charge to higher upper voltage limits as well as the cell's ability to hold and maintain the state of charge (SOC) are direct results of composite anode and key bilayer formation. The first 3 pre-cycling stages (510, 520 and 530) condition the cell to enable in-situ composite cell and bilayer formation. Where the remaining cycle sets for >90 cycles (540, 550, 560 and 570) easily maintain a high voltage upon charge (all sets showed discharge voltage onsets>3.9V) which then enables high discharge capacity performance (as high as 1.50 uAh/mm$^2$). Hence, FIG. 5 illustrates the magnitude of charge transfer resistance which is decreased upon formation of the composite anode containing silicon-based interphase/lithium metal bilayer, whereas FIG. 5A displays the performance impact of the in-situ composite material formation and the electrochemical method of pre-cycling the cell to enable in-situ composite material formation via independently customized stages or cycling sets.

Figure 6A:
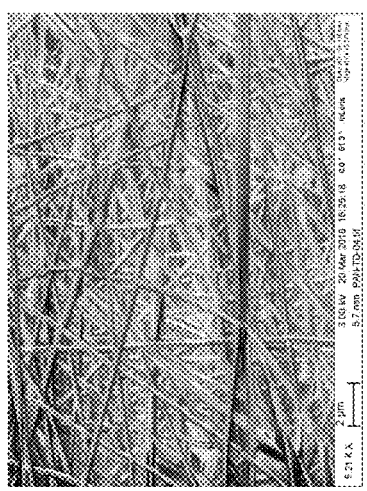
FIG. 6A is a scanning electron microscope (SEM) micro graph portion of the top region shown in FIG. 6 showing the polyacrylnitrile (PAN) component, without the integrated polymer electrolyte component, as a fabric-like inter-woven layers of PAN material which is saturated with the PCl/SN mixture.
Figure 6:
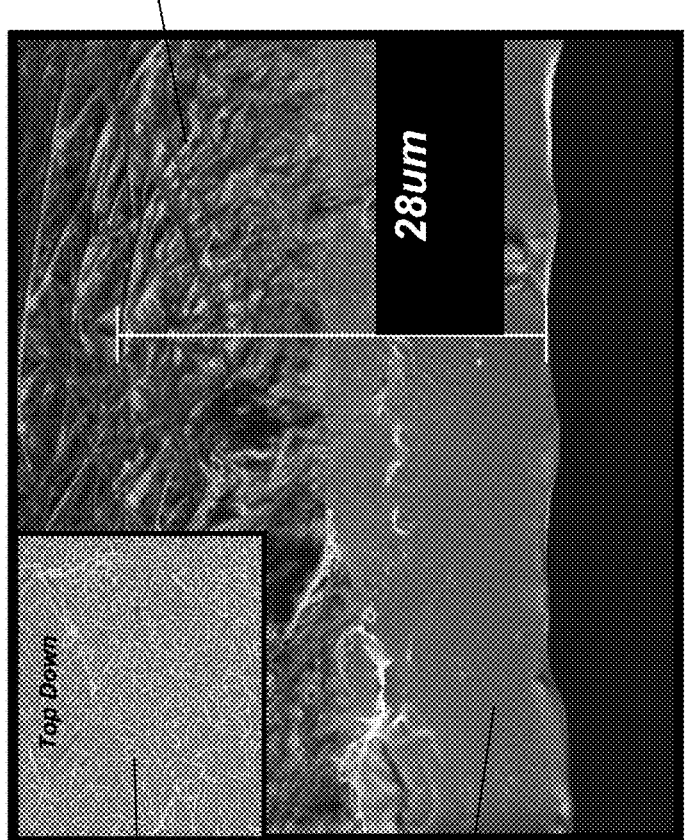
FIG. 6 is a micro graph image of a cross section and top down views of a solid polymer electrolyte (SPE) with a 10:1 ratio of Polycaprolactone (PCl) to Succinonitrile (SN) components saturating electrospun polyacrylnitrile (PAN).

FIG. 6 is a micro graph image of a cross section 600 of a solid polymer electrolyte (SPE) with a component ratio of 10:1 Polycaprolactone (PCl) to Succinonitrile (SN) where the polyacrylnitrile (PAN) component is observable in FIG. 6A, the top region 605 of the micro graph as a fabric-like inter-woven layers of PAN material which is saturated with the PCl/SN mixture. Also shown is an inserted image 605 which is a top-down SEM micro graph of the same sample where the homogeneity of the PAN matrix saturated with the PCl/SN mixture is illustrated.

In a preferred embodiment, the electrolyte 138 is solid under operation conditions and comprises a top layer of 130T of a Lithium ion conductive material, a bottom layer of Lithium ion conductive material 130B, separated by a separation layer 135. The Lithium ion conductive materials allow Lithium ions to move between the cathode (180, 185) and anode 175 and ultimately to external connections (192, 194) of the energy storage device/battery 100. In some preferred embodiments, the top 130T and bottom 130B Lithium conductive layers 130 are made from a Lithium salt compound 130 immersed in a Lithium Conductive plasticizer-type Medium Succinonitrile (SN) and a polymer type structural material polycaprolactone (PCl). In some preferred embodiments, the Lithium salt compound 130 is LiTFSi.

The separation layer 135 performs the function of a dielectric material where the separator maintains electrical separation between the cathode and anode electrodes, thereby preventing short circuiting of the cell or resistance to ion/electron separation processes. In a preferred embodiment, the separation layer 135 is polyacrylnitrile (PAN.) The PAN is a compressible material which allows the electrolyte (e.g. SPE) to expand and contract as the Lithium metal layer 240 grows and shrinks in thickness during charge and discharge cycles, respectively. PAN's compressibility property also helps in varying the thickness of the SPE. The mechanical flexibility of the PAN material aids in the integration of separator material into the 3D patterned silicon trench features—where PAN's mechanical flexibility can maintain good adhesion of anode/electrolyte/cathode materials both inside and above the plane of the silicon trench.

In preferred embodiments, the Lithium ion conductive layers 130 start out as a mixture of a first material that has good Lithium ion conductivity and second material that has good structural as well as Lithium ion conductivity properties. During the galvanostatic cycling, the first and second materials combine uniformly, where plasticizer-like Lithium-conductive components (e.g., succinonitrile (SN)) representing one of the lithium ion conductive layer mixture materials has been illustrated in the past to progressively solvate around mixture and composite materials and the Lithium ion conductivity of the resulting electrolyte and/or electrolyte/electrode interface(s) composition(s) goes up, concurrently with the decrease of ion transport resistance across these regions of the cell. Part of this increased conductivity was shown by the Warburg impedance $W_{o1}$ 446 going to zero after formation of the active region interface 190—as described above (FIG. 5) with the establishment of the elongated R1 (464)/CPE1 (468) parallel model element which arises from the creation of the Si-based Interphase/Li-metal bilayer.

It is also desired that while the active composite anode region interface 190 is formed, the electrolyte 138 (e.g. SPE when comprising solid materials) be in 3D conformation with the surfaces that contain it and that the SPE adheres well to the anode 175 and cathode (180, 185) structures. These properties further enable the in-situ processing and creation of the high performing electro-chemistry of the energy storage device.

In a preferred embodiment, the material having a good Lithium ion conductivity is Succinonitrile (SN) in combination with the LiTFSI Lithium salt. Other materials with high Lithium ion conductivities which can maintain conformal SPE and/or polymer type electrolyte properties may also be used. For example, various combinations of the following materials would be comparable in desired properties: polymer structure host material can comprise any one or more of the following: poly(ethylene oxide) (PEO), poly(propylene oxide) (PPO), Poly(dimethylsiloxane), Poly(vinyl chloride), etc. The Lithium compound comprises any one or more of the following: lithium hexafluorophosphate, lithium perchlorate, trifluoromethanesulfonimide lithium salt, lithium chloride, Lithium Bromide, $LBF_4$, etc., and where the plasticizing material can be poly(ethylene glycol) (PEG), aprotic organic solvents, dimethylsulfoxide (DMSO), etc. However, it should be noted that the use of succinonitrile is the primary plasticizer-like component in current state of the art work which has been shown to increase capacity magnitudes upon progressive cycling.

In a preferred embodiment, the material having a good structural and conformational properties is Polycaprolactone (PCl.) Other material with suitable polymer structure host material. may also be used. For example, polymer structure host material can comprise any one or more of the following: poly(ethylene oxide) (PEO), poly(propylene oxide) (PPO), Poly(dimethylsiloxane), Poly(vinyl chloride), etc.

Testing showed (see discussion of FIG. 7) that by varying the ratio of PCl to SN, both the SPE thickness and the conductivity (e.g. to Lithium ions) can be changed. For example, adding more PCl increases the thickness, adhesion, and structural integrity of the electrolyte but decreases the conductivity. (A 10:1 ratio of PCl to SN was chosen for the micro graph image 600 because this ratio clearly showed both the conductive 130B and PAN 135 layers). Typically, adding more plasticizer material to a polymer electrolyte mixture will significantly increase conductivity of electrolytes at ambient temperatures, but will come at the cost of deteriorating the polymer structure host mechanical integrity.

Where the PCl/SN combined with LiTFSI salt and electrospun PAN separator—it was found that the composite SPE formed in the PCl/SN ratios used led to a trend which displayed increasing ionic conductivity with increasing SN mixture component, yet also increasing thickness of the SPE composite as the PCl/SN ratio became larger (e.g., 10:1 to 2:1). Such phenomena is thought to be due to the ability of the SN plasticizer to breakdown or more completely saturate the PCl component when the concentration of the plasticizer used is relatively high. The effect this has on the composite SPE matrix is to unsaturate the PCl material within/on the PAN matrix—thereby decreasing the compressibility of the SPE composite and creating an overall thicker SPE composite electrolyte (e.g., by decreasing the relative PCl component which acts as the "glue" to hold the interwoven PAN layers together, the PAN layers can more easily separate from one another and expand spatially—thereby increasing the overall SPE thickness).

The level of conformal adhering, Lithium ion conductivity, and SPE thickness are all "tunable" by adjusting the ratio of the structural material to the conductive material, e.g. PCl to SN in the SPE composite electrolyte.

Factors that increase Lithium ion conductivity include: reducing polarization resistance of the electrolyte material, The SPE thickness.

Generally, it is known that decreasing the thickness of electrolyte materials can increase the rate or power capabilities of the energy storage device (e.g. decreases the resistance to ion transport through the electrolyte). However, increasing or decreasing the thickness of the electrolyte/separator layer in composite electrolytes such as SPE's can have a multi-faceted effect. For example, in the case of the present trend, the electrolyte component (PCl) was decreased, but led to a consequential increase in SPE thickness due to PAN "fluffing out" and increasing the SPE thickness—yet the added relative ratio of SN in the composite is known to increase ion conductivity of the resulting SPE composite which is observed as the formulation is changed from 10:1 to 2:1 (observed in FIG. 11).

Decreasing the relative surface area related to ion-based charge transfer processes.

High Lithium ion conductivity decreases the resistance for ion transport through the electrolyte. As resistance to transport the ions through the electrolyte decreases, the relative overpotential (how much potential (voltage) is lost during the initial charging or discharging of the cell) also decreases. This lowering of resistance and consequential overpotential is directly measured with the polarization resistance (Rp) of the electrolyte material—as observed with the semicircles, and fitted RC models thereof, resulting from Nyquist plots of symmetric Electrolyte cells tested via electrochemical impedance spectroscopy (EIS).

Polarization resistance is the transition resistance between electrodes (e.g. anode and cathode) and the electrolyte, e.g. SPE 138. More specifically, polarization resistance is the resistance to polarize charge within a charge-conductive medium to a magnitude which enables charge-transfer from the charge-conductive medium to another adhered medium. An increased resistance to the flow of ionic current in the electrolyte material bulk and the SPE's respective interfaces reduces the voltage across the battery through increasing the overpotential required for ion transport processes (energy barrier to "start" ion movement is high in high polarization resistance type cells) and reduces overall battery performance.

Ionic conductivity (IC) is defined as equal to $$= \frac{1}{R_P}\left(\frac{e}{S}\right)$$

where:
e=thickness of the SPE. In this structure 600, the total SPE thickness was 3.8e-3 cm.

S=Surface area, in this structure 600 the Surface area=1.98 cm$^2$

Resulting in an IC of 4.25e-4 S/cm (Siemens per centimeter.)

Figure 7A:
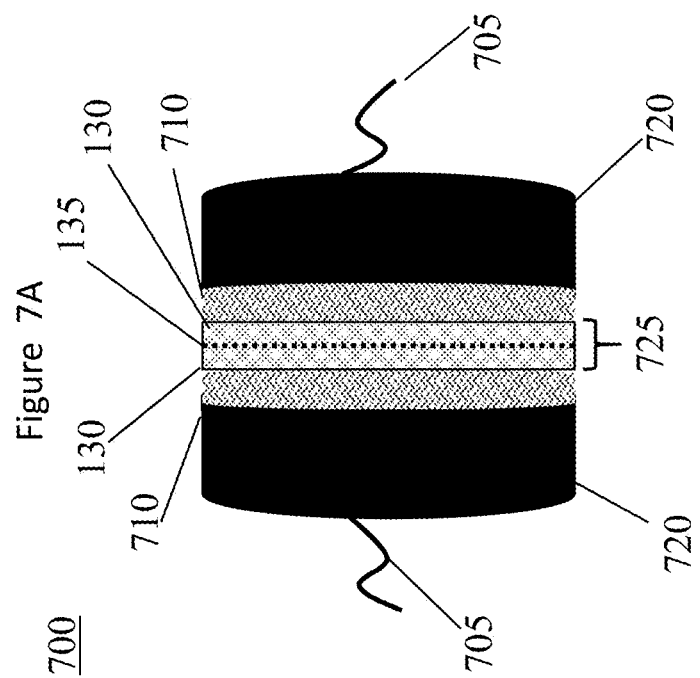
FIG. 7A is a drawing of a symmetric electrochemical test device for a solid polymer electrolyte (SPE) with novel ratios of electrolyte components Polycaprolactone (PCl) and Succinonitrile (SN) symmetric about polyacrylonitrile (PAN.)

FIG. 7A is a drawing of a symmetric cell test device 700 for measuring current flow thorough an impedance of one or more solid polymer electrolytes (SPE) units with different novel ratios of electrolyte components Polycaprolactone (PCl) and Succinonitrile (SN) separated by polyacrylnitrile (PAN.)

A test device 700 like this was used to obtain the data in FIGS. 8 through 11.

An electric potential (e.g., 50 mV) with a frequency that can be varied is applied though 2 electrical connections 705 each of which is connected to a conductive (preferably copper) disc 720. The surface areas 710 of the discs are chemically cleaned (e.g., with Nitric acid solution) prior to use to provide a good electrical connection to a Solid Polymer Electrolyte (SPE) 725. The SPE 725 is made of a separation layer 135, preferably PAN, separating an electrolyte layer 130 on either side of the separation layer 135. Each electrolyte layer 130 is electrically connected to the clean surface 710 of an opposite conductive disc 720 to form an electrical circuit through the SPE. Tests are run where a voltage is applied across the 2 electrical connections 705 and the frequency of the voltage is swept from a high to low frequency. Impedance magnitude and the respective phase angle with the applied voltage are measured and recorded, independently, at a plurality of frequencies.

Figure 7B:
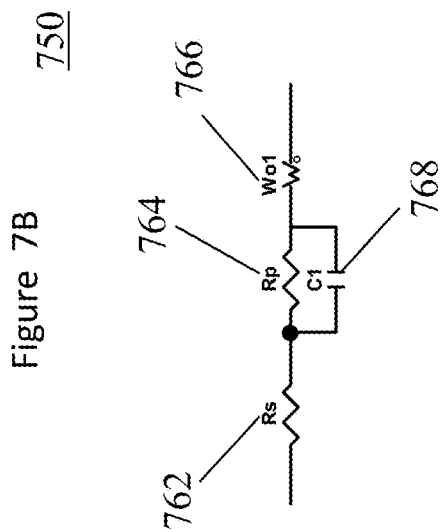
FIG. 7B is a resistive/capacitive (RC) electrical model of an example solid polymer electrolyte (SPE) tested using the device in FIG. 7A.

FIG. 7B is a resistive/capacitive (RC) electrical model of different example solid polymer electrolytes (SPE) tested using the device in FIG. 7A.

The model 750 comprises a resistance, $R_s$ 762; in series with a parallel combination of a resistor, Rp 764 and capacitive impedance C1 768; in series with a "Warburg impedance, $W_{o1}$ 766.

Generally, in EIS analysis, Rs 762 is measured/estimated as the real part of the impedance at the higher or highest frequency data point of the Nyquist plot. See FIGS. 8 through 10. Rs 762 is a pure resistive component between the conductive discs 720 of the test device 700. Rs is often associated or attributed to contact resistance relating to the testing of a cell or device.

The parallel combination of a resistor, Rp 764, and capacitive impedance, C1 768, add an RC time constant to the circuit model 750.

A Warburg impedance 766 is connected in series.

As discussed in FIG. 4A, the actual data measured is placed on Nyquist plots (see FIGS. 8 through 10) where a dot/circle at each given frequency applied is the experimental data. The RC circuit model 750 is used to best fit a curve to the actual data. The best fit curve is represented by a dashed line of the Nyquist plots presented in FIGS. 8 through 10. Nyquist plots are done for three different ratios of PCl to SN in the electrolyte layers 138.

Figure 8:
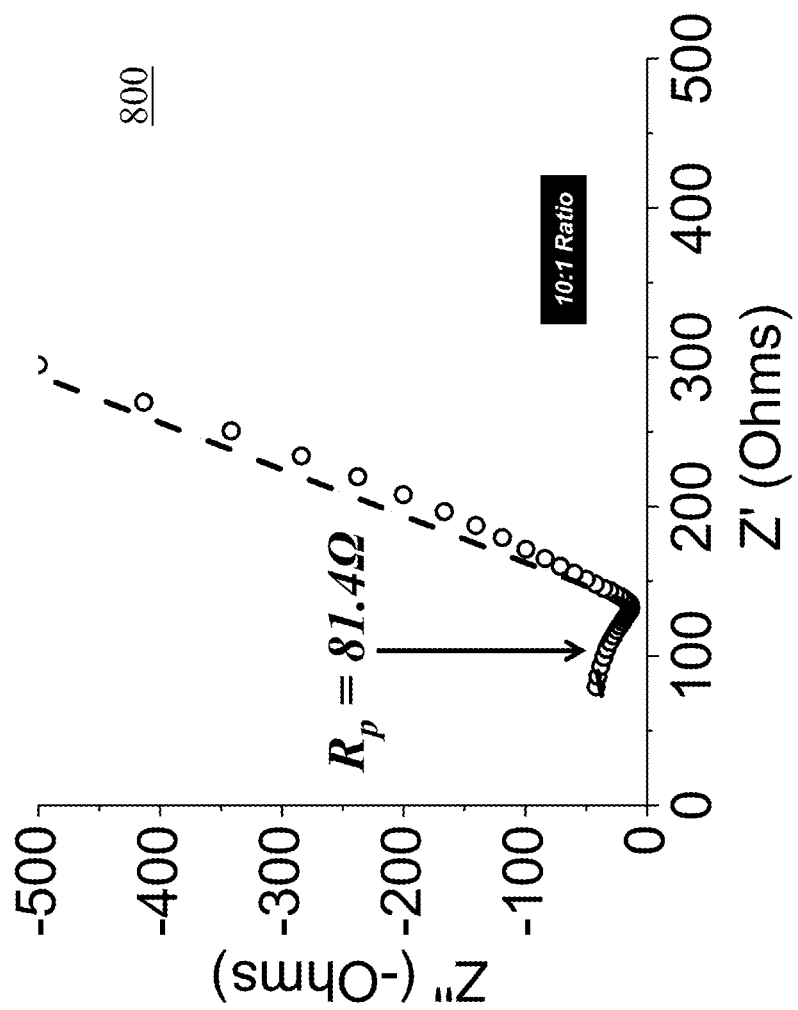
FIG. 8 is a Nyquist plot of a symmetric electrochemical test device containing solid polymer electrolyte (SPE) with a polyacrylnitrile (PAN) separator and a 10:1 ratio of PCl to SN.

FIG. 8 is a Nyquist plot 800 of a solid polymer electrolyte (SPE) with a polyacrylnitrile (PAN) separator and a 10:1 ratio of PCl to SN in the electrolyte layers 130. Using techniques described in FIG. 4, fitting the RC model from FIG. 7B determines an Rp equal to 81.4Ω.

Figure 9:
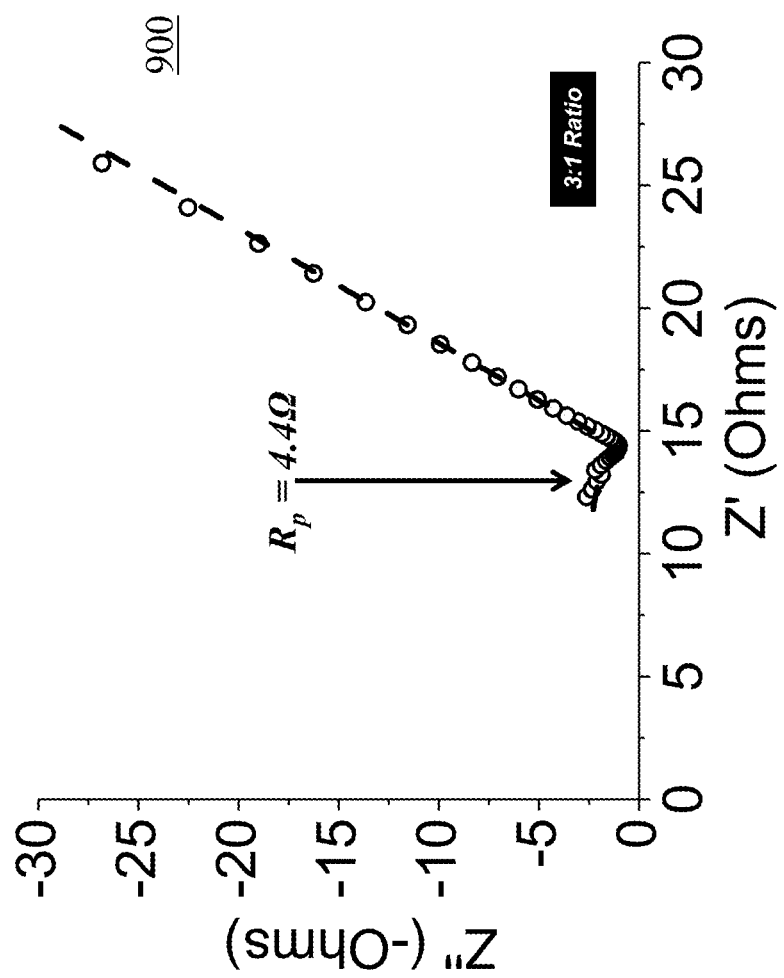
FIG. 9 is a Nyquist plot of a symmetric electrochemical test device containing solid polymer electrolyte (SPE) with a polyacrylnitrile (PAN) separator and 3:1 ratio of PCl to SN.

FIG. 9 is a Nyquist plot of a solid polymer electrolyte (SPE) with a polyacrylnitrile (PAN) separator and 3:1 ratio of PCl to SN in the electrolyte layers 130. Using techniques described in FIG. 4, fitting the RC model from FIG. 7B determines a Rp equal to 4.4Ω.

Figure 10:
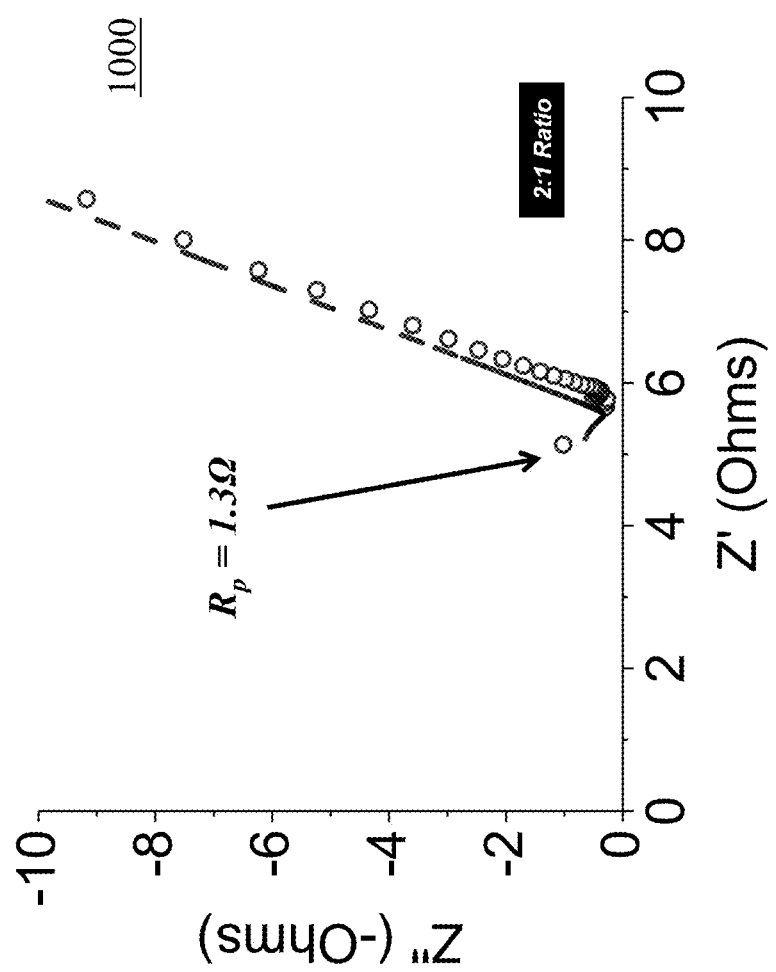
FIG. 10 is a Nyquist plot of a symmetric electrochemical test device containing solid polymer electrolyte (SPE) with a polyacrylnitrile (PAN) separator and 2:1 ratio of PCl to SN.

FIG. 10 is a Nyquist plot of a solid polymer electrolyte (SPE) with a polyacrylnitrile (PAN) separator and 2:1 ratio of PCl to SN in the electrolyte layers 130. Using techniques described in FIG. 4, fitting the RC model from FIG. 7B determines a Rp equal to 1.3Ω.

Figure 11:
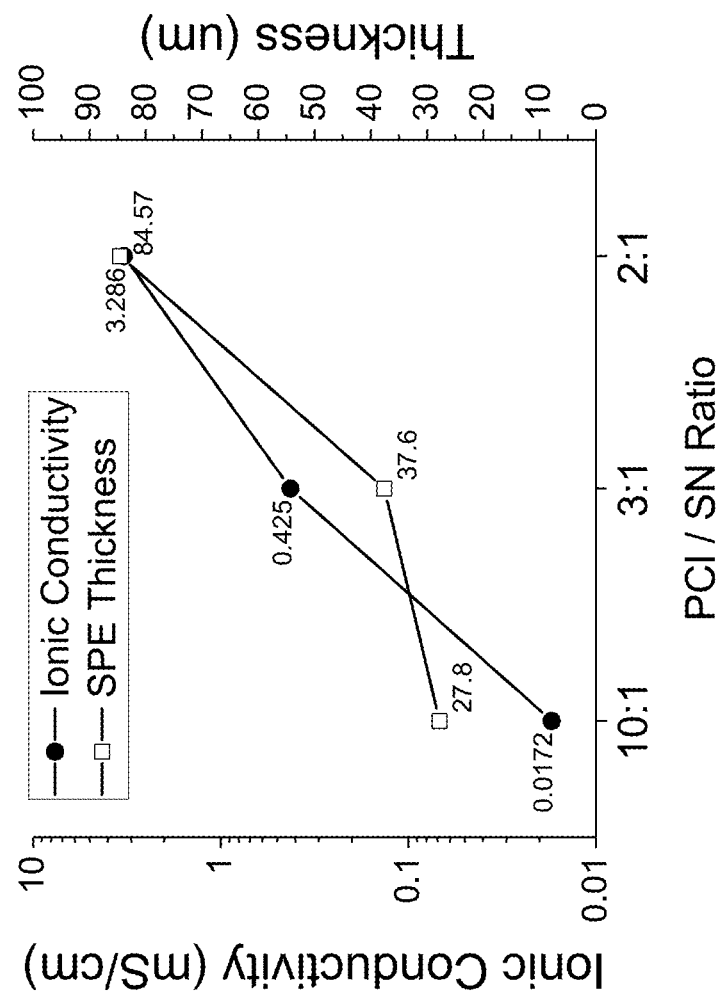
FIG. 11 is a thickness vs ionic conductivity comparison of a solid polymer electrolyte (SPE) measured as a function of polycaprolactone (PCl) to Succinonitrile (SN) ratios used in the polymer formulation of the electrolyte.

FIG. 11 is a thickness and conductivity of a solid polymer electrolyte (SPE) measured as a function of polycaprolactone (PCl) to Succinonitrile (SN) ratios in the polymer formulation of the electrolyte.

Using known EIS techniques, some described above in FIG. 4A, the components of the circuit model 750, e.g. Rs 762 and Rp 764, are determined and the Lithium ionic conductivities (in mS/cm) of the SPE 725 are determined and plotted 1100 at each of the three PCl/SN ratios: 10:1, 3:1, and 2:1.

The data shows the multi-faceted interplay of the polymer structure host, plasticizer with respect to relative concentrations and how they impact SPE structure, thickness, ionic conductivity and morphology. All critical parameters which influence a given application and/or 3D substrate.

A thicker, less compact SPE can result in higher ion conductivity (higher relative SN concentration) but less structural integrity (lower relative PCl concentration) and therefore more difficulty of 3D & 2D integration due to non-compactness A thinner, more compact SPE can result in a low Ion conductivity (lower relative SN concentration) but high structural integrity (higher relative PCl concentration). However, difficult 3D integration arise due to decreased flexibility.

A thickness/compactness ratio of about 3:1 for the SPE is just right for both 3D and 2D integration and has relatively high (0.425 mS/cm) ionic conductivity in ambient conditions. SPE electrolytes for any given application should standardly have ~10E-4 S/m ion conductivity when using plasticizer components.

Using a 3:1 ratio afforded advantages in 3D and 2D integration capabilities. This formulation enables high connectivity/adhesion between cell components inside (composite anode) and outside of trench (cathode) in one preferred structure 100 in FIG. 1.

Figure 11A:
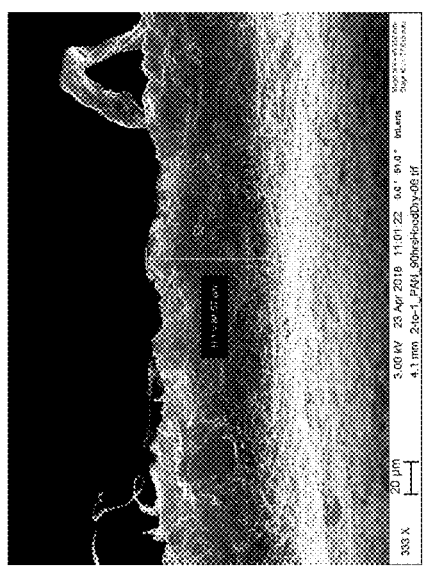
FIG. 11A is a micro graph image of a cross section of two layers of a solid polymer electrolyte (SPE) with a 10:1 ratio of Polycaprolactone (PCl) to Succinonitrile (SN) components saturating electrospun polyacrylonitrile (PAN).

FIG. 11A is a micro graph image of a cross section of two layers of a solid polymer electrolyte (SPE) with a 10:1 ratio of Polycaprolactone (PCl) to Succinonitrile (SN) components saturating electrospun polyacrylnitrile (PAN) showing an SPE thickness of 27.8 µm and yielding an ionic conductivity of 0.0172 mS/cm.

Figure 11B:
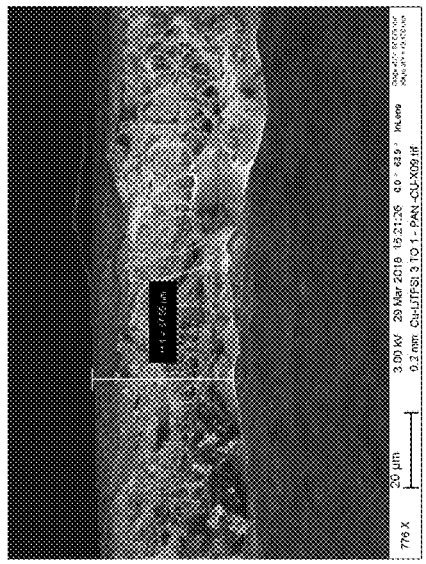
FIG. 11B is a micro graph image of a cross section of two layers of a solid polymer electrolyte (SPE) with a 3:1 ratio of Polycaprolactone (PCl) to Succinonitrile (SN) components saturating electrospun polyacrylonitrile (PAN).

FIG. 11B is a micro graph image of a cross section of two layers of a solid polymer electrolyte (SPE) with a 3:1 ratio of Polycaprolactone (PCl) to Succinonitrile (SN) components saturating electrospun polyacrylnitrile (PAN) showing an SPE thickness of 37.6 µm and yielding an ionic conductivity of 0.425 mS/cm.

Figure 11C:
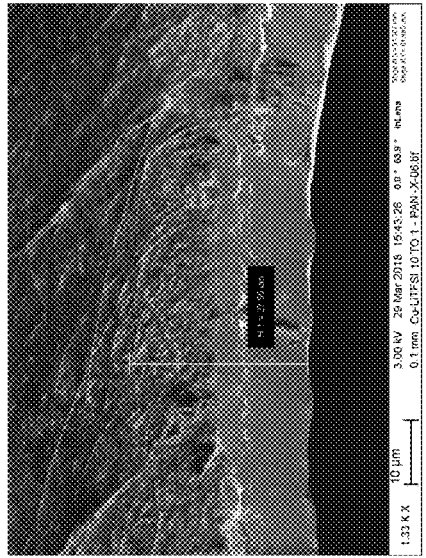
FIG. 11C is a micro graph image of a cross section of two layers of a solid polymer electrolyte (SPE) with a 2:1 ratio of Polycaprolactone (PCl) to Succinonitrile (SN) components saturating electrospun polyacrylonitrile (PAN).

FIG. 11C is a micro graph image of a cross section of two layers of a solid polymer electrolyte (SPE) with a 2:1 ratio of Polycaprolactone (PCl) to Succinonitrile (SN) components saturating electrospun polyacrylnitrile (PAN) showing an SPE thickness of 84.57 µm and yielding an ionic conductivity of 3.286 mS/cm.

Figure 12:
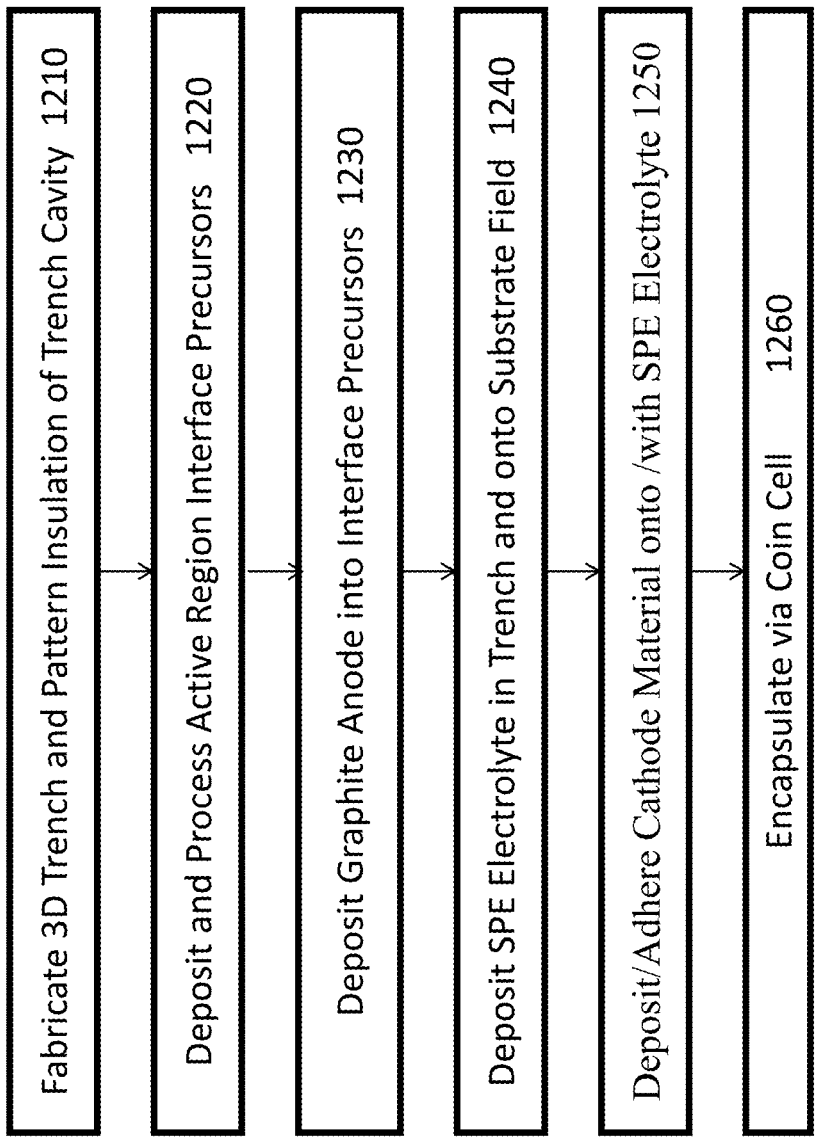
FIG. 12 is a flow chart showing a method of making an energy storage device having an anode in a 3D silicon trench substrate, a solid polymer electrolyte (SPE) in and outside of the silicon trench substrate, and a cathode material adhered to the SPE on the substrate field where all materials are encapsulated in a coin cell apparatus.

FIG. 12 is a flow chart showing an method of making 1200 an energy storage device 100 having a solid polymer electrolyte (SPE) (for example 130B, 135, 130T or 725), an anode 175 in a full 3D trench 150 in a silicon substrate 160, and a partially formed novel active region interface 190 between the anode 175 bottom 170B and the substrate 160. The process 1300, below, fully forms the active region interface 190.

In a preferred embodiment, the substrate 160 is silicon, crystalline silicon, and/or doped silicon, as described above. A partially formed active region interface 190 is initially made by mixing a conductive polymer adhesive like PANI with a Lithium compound, e.g. a Lithium salt like LiTFSI. Alternative embodiments use PANI without mixing a Lithium compound. In a preferred embodiment, the anode 175 is graphite.

In a preferred embodiment, the SPE 138 has a bottom layer 130B and a top layer 130T with a separation layer 135. The bottom 130B and top 130T layer of the SPE are initial formed with a ratio combination of a structural component like Polycaprolactone (PCl) and an ionically conductive plasticizing component like Succinonitrile (SN). In a preferred embodiment, the separation layer 135 is made of polyacrylnitrile (PAN).

In a preferred embodiment, the cathode (180, 185) is made from a conductive metal sheet, e.g. aluminum or an aluminum alloy, attached to a Lithium containing material layer 180 like Lithium Iron Phosphate (LFP).

In step 1210, 3D trench features are fabricated, e.g. the trench cavities 150 are etched into base substrates 160 like silicon. One or more insulating layers (154, 154T, 156, 156T) are formed. Any insulating material is removed, e.g. by an etching process from the active area 120 at the bottom of the trench 150.

In step 1220, the conductive polymer adhesive, e.g. PANI, is mixed with Lithium compound, e.g. LiTFSI. (In alternative embodiments, unmixed conductive polymer adhesive, e.g. PANI is used.) This material is deposited on the active area 120 on the trench bottom 170B. Optionally, this material is deposited on the trench walls. The material is deposited by casting methods, pipette methods, spin coating, doctor blading, or any single or combined method which conformally deposits the conductive polymer adhesive on the base of the 3D silicon trenches.

After depositing, the PANI or PANI mixture is heated from 1 to 10 min at between 60 C to 160 C to cross link the polymer material together.

In step 1230, the anode 175 material, in a preferred embodiment graphite, is deposited in the trench 150 via slurry casting, pipette methods, spin coating, spin coating, etc. Any excess graphite material is removed from the field surface through doctor blading techniques (to scrape excess material away from surface via a metal or glass blade). In one embodiment, the anode is added to the trench, followed by polymer electrolyte material, followed by more anode material. In another embodiment, polymer electrolyte material is added to the trench prior to any anode material— where the anode material is added on top of the polymer material deposited in the trench. In yet another embodiment, the polymer electrolyte material is pre-mixed with the anode material (adding between 1% to 60% by mass or volume polymer material to anode slurry material), then deposited in the trench. Then the anode is air dried in air followed by vacuum drying between 2 to 48 hrs. After drying, the anode 175, is optionally, briefly pressed with conformal trench fitting molds using hand applied pressure. Another option is to allow the anode material or composite anode/polymer electrolyte material to briefly dry (30 min to 6 hrs) in air or 20 min to 2 hrs in a vacuum oven, and then briefly press with conformal trench fitting molds using hand applied pressure. All these processes 1230 while the anode 175 materials or anode/polymer composite materials are residing in the trench 150.

In step 1240, the SPE (130B, 135, 130T) is deposited on the top of the anode 175 and the top either of the substrate 160 or any insulating layers (154T, 156T.) The electrolyte layer 130B, the separation layer 135, and the top electrolyte layer 130T are sequential deposited by any of the following methods: casting, pipette methods, spin coating, etc. for the polymer electrolyte and direct layer application with the PAN separator material (e.g., dicing out suitable PAN dimensions and layering it on top of polymer electrolyte which resides on the anode or anode/polymer electrolyte composite). Additionally, the Polymer/PAN/Polymer SPE can be fabricated in mass (sheets) and then diced when the SPE material has condensed. Then the diced SPE can be inserted into the 3D trench or on top of it. Heat treatments can also be applied to better adhere the SPE to surrounding layers, as the temperature of the SPE will determine the relative viscosity and wetting or adhesion capability of the polymer component of the SPE. Additionally, the PAN material can be adhered/laminated to the cathode material in a preliminary fashion. Then the polymer electrolyte can be applied in the trench/on the surface of the anode and then the PAN-coated cathode material can be applied to the polymer electrolyte when inserted in the trench and/or on the polymer electrolyte material. The utilization of pressure and/or applied heat (35 C to 65 C) the polymer electrolyte material will soak through the PAN material adhered to the cathode, thereby forming the polymer/PAN/polymer SPE 138 and in the process will make intimate contact with both the anode and cathode (see below). The electrolyte bottom 134 is in physical, chemical, and electrical contact with the anode 175 as facilitated with temperature and pressure control of the cell stack—as the viscosity and wetting capability of the polymer electrolyte material is controllable upon application of heat (e.g., 35 C to 65 C) and maintaining pressure during this process and while the completely adhered cell cools enables physical, chemical and electrical contact of the final formed SPE with other active battery materials.

In step 1250, the cathode (180, 185) is made and connected. The cathode Lithium compound layer 180 is disposed on a cathode conductive layer 185, e.g. aluminum or aluminum foil or aluminum composite (e.g., aluminum—tantalum composite material). In a preferred embodiment, the Lithium compound layer 180 is made of Lithium Iron Phosphate (LFP) or Nickel Manganese Cobalt (NMC) or Lithium Manganese Oxyfluoride (LMOF). The Lithium compound layer 180 and the cathode conductive layer 185 adhere and are electrically and structurally connected. The bottom 181 of the Lithium compound layer 180 is attached to the top 136 of the SPE to make a good structural and electrical contact.

In step 1260, the substrate 160, anode 175, electrolyte (130B, 135, 130T), cathode (180, 185) and all other internal components and layers are optionally encapsulated 1260. In one preferred embodiment, an upper 192 and lower 194 coin cell casting are pressed and crimp sealed (198, and 199, respectively) together. In alternative embodiments, the battery cell structure may be encapsulated or not with coin cell castings (192, 194) and/or be sealed by known semiconductor methods on a substrate 160 and/or connected to other components on that substrate 160. In latter stages of the manufacture, circuits containing one or more of these energy storage devices 100 could be diced from a wafer have a plurality of these circuits.

Figure 13:
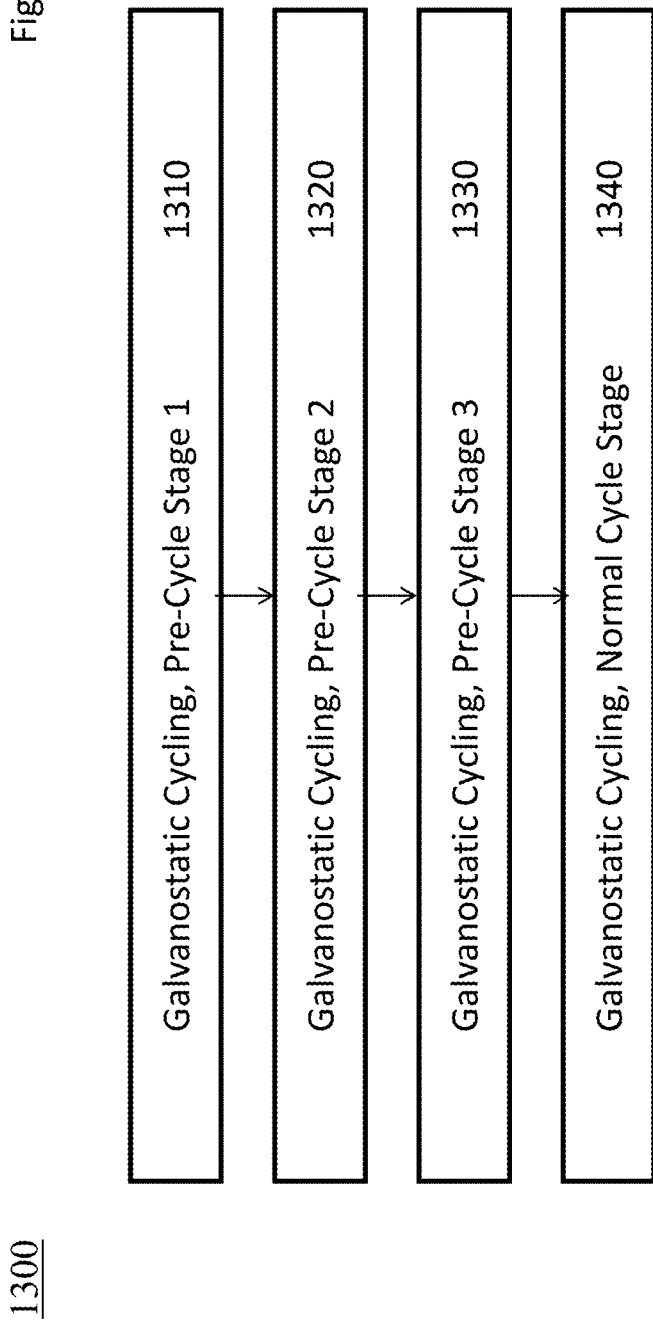
FIG. 13 is a flow chart showing an in-situ method of composite electrode fabrication using multiple stages of galvanostatic cycling of an energy storage device to fully form the novel active composite region containing the solid polymer electrolyte (SPE), Silicon trench base, active anode material and active region interface precursors.

FIG. 13 is a flow chart showing a method of galvanostatic current cycling 1300 of an energy storage device 100 to fully form the novel active region interface 190 and the interdispersion/working form of the solid polymer electrolyte (SPE) prior to normal cycling.

Once the energy storage device 100 is made with initial (e.g. precursor) materials, in preferred embodiments a current source is connected across the terminals (e.g. 192, 194) of the device 100 in order to cycle current of different magnitudes through the device 100 at desired working voltage range(s). As explained in this disclosure, this current cycling 1300 causes electrochemical changes in parts of the device 100 to improve performance of the device 100 over the entire lifetime of operation.

The Galvanostatic Cycling, Pre-Cycle Stage 1 is step 1310 of the current cycling process 1300. Step 1310 first charges the cell 100 by applying a current between 1 uA to 150 uA. This charge cycle ends when the terminal voltage of the device reaches an upper voltage limit of between 500 mV and 2.5V. The cell 100 is then discharged by applying a current in the opposite direction at between 1 uA and 25 uA. This discharge stops at a lower voltage between 0.010V to 0.050V. At this point Pre-Cycle Stage 1 either terminates or can be repeated up to 20 times and then terminated.

During Pre-Cycle Stage 1, e.g. cycling at low current magnitude at low upper voltage, the base substrate is being saturated with Lithium ions that are moving from the cathode 180 through the SPE and anode 175 because there the Lithium metal 240 and interphase 230 layers are only beginning to form.

As the Lithium metal layer 240 forms, Lithium ions from the cathode 180 are progressively suppressed from entering or leaving the substrate 160 and the interphase layer is forming where electrons are moving out of the top of the silicon substrate to combine with Lithium ions from the cathode 180 to make more Lithium metal in the Lithium metal layer 240 during device 100 charge cycles. The opposite happens upon reversing the polarization of the applied current. However, there is relatively less Lithium ion migration into or out of the silicon substrate 160 once the Lithium metal layer 240 is formed. This greatly reduces stresses, cracking, and dendrite formation in the substrate 160 because volume changes in the substrate 160 due to changing Lithium ion concentration are reduced and a robust top Lithium-containing layer well adhered to the silicon substrate prevents silicon material degradation and therefore maintains a low ion and electron resistance.

Use of the precursor materials, the conductive polymer adhesive mixed with Lithium compound, more preferably a Lithium salt, and even more preferably LiTFSI, increases the conductivity/mobility of Lithium ions through the PANI in the forming active composite anode region interface 190 so the Lithium metal and hence the Lithium layer 240 initially can form when Li-ions from the cathode connect with electrons from the base substrate 160. Moving in an opposite direction upon application of opposite polarized current, the electrons from the substrate 160 move towards the cathode via an external circuit, the Lithium ions from the composite anode initially move into the SPE as Lithium is transported from anode material (e.g., via de-intercalation from graphite and/or stripping from Li-plated metal) and into the cathode host material.

As the Lithium metal layer 240 forms, the bulk of the lithium which is contained in the silicon substrate 160 is prevented from returning into the electrolyte/cathode and progressively, Lithium from the electrolyte region is prevented from crossing the Li-metal layer and reacting with silicon substrate material 160 (the Lithium ions from the cathode 180 are prevented from entering the substrate 160). These electrons and Lithium ions combine in the Lithium metal layer 240 and cause it to grow while charging. The Lithium metal layer 240 also prevents (essentially) the Lithium ions saturating the substrate 160 from leaving the substrate 160—thereby preventing the well known Silicon-Lithium degradation mechanism due to the up to 400% volume change during silicon lithiation and de-lithiation processes.

As electrons leave the surface of the substrate in the active area 120, the interphase layer 230 forms in the region where electrons have been polarized in the substrate 160 near the silicon/conductive adhesive interface. Since the Lithium ion conductivity is high, initially, due to the conductive polymer adhesive mixed with the Lithium salt compound, the Lithium metal layer 240 and interphase 230 layers forms in an energetically favorable fashion and the interphase layer which enables the Lithium plating mechanism is much thinner than in the prior art. The layers are also smoother, do not contain voids or gaps or any additional material between the Silicon/Lithium plated layer and provide better structural adhesion and electrical and chemical connection compared with more resistive materials which create relatively thicker interphase layers, that enable a less homogeneous plating mechanism—creating voids and gaps between the interphase and lithium metal layers—resulting in higher impedance and therefore poorer performing energy storage devices.

The "bi-layer" of Lithium metal 240 and interphase layer 230 also provide better containment for Lithium ions, either saturated in the substrate 160 or contained in the trench 150. Additionally, and critically important, the "bi-layer" enables very low impedance at the Silicon/Li-metal/PANI/Graphite interface when moving charge (e.g., ions and electrons) across the respective interface—which enables high performance of the energy storage device.

Once the active region interface 190 is formed there is little Lithium ion migration in or out of the substrate 160 reducing substrate and device cracking from large volume changes of the substrate 160.

The formation of a well formed/adhered "Bi-layer" of Li metal and silicon based interphase allows electrons to meet Li$^+$ and plates on Li metal layer so as the Lithium metal layer 240 grows the Li-metal associated anode bottom 170B is expanded into the anode 175 upon charging and compresses upon discharge, where at full discharge a minimum Li-metal layer remains well adhered in the bi-layer fashion. Hence the bi-layer is the key to sustainable, rechargeable Li-ion cell high performance.

Step 1320, the Galvanostatic Cycling, Pre-Cycle Stage 2, begins when Pre-Cycle Stage 1 terminates. Start by charging the cell 100 by applying a current between 1 uA to 115 uA. Stop applying the charge current when the upper voltage is between 500 mV and 3.5V, a higher voltage range than in Pre-Cycle Stage 1. Discharge the cell 100 by applying a current in the opposite direction at a magnitude between 1 uA and 25 uA, with the applied discharge current being the same or higher magnitude than the discharge current applied in Pre-Cycle Stage 1 1310. Stop discharging the cell when the lower voltage is between 0.010V to 0.0.500V, with the lower voltage cutoff magnitude being the same or higher magnitude than the lower voltage cutoff magnitude utilized in Pre-Cycle Stage 1 1310. Stop Pre-Cycle Stage 2 or repeat Pre-Cycle Stage 2 Charge/Discharge schedule up to 20×.

Step 1330, the Galvanostatic Cycling, Pre-Cycle Stage 3, begins when Pre-Cycle Stage 2 terminates. Start by charging the cell by applying a current between 1 uA to 115 uA. Stop the charge cycle when the upper voltage is between 500 mV and 4.5V, a higher upper voltage cutoff limit than in Pre-Cycle Stage 2. Discharge the cell by applying a current in the opposite direction with a magnitude of between 1 uA and 25 uA, with the applied discharge current being the same or higher magnitude than the discharge current applied in Pre-Cycle Stage 2 1320. Stop discharging the cell at lower voltage between 0.010V to 1V, with the lower voltage cutoff magnitude being the same or higher magnitude than the lower voltage cutoff magnitude utilized in Pre-Cycle Stage 2 1320. Stop Pre-Cycle Stage 3 or repeat the Pre-Cycle Stage 3 charge/discharge schedule up to 20 times.

At this point the active region interface 190 and the SPE have been electrochemically transitioned to their final compositions and the energy storage device 100 is operational.

Step 1340, the Galvanostatic Cycling, the Normal Cycle Stage, begins when Pre-Cycle Stage 3 terminates. Begin by charging the cell by applying a current between 20 uA to 200 uA. Stop the current charge cycle when the upper voltage is between 500 mV and 6V, higher than in Pre-Cycle Stage 3. Discharge the cell by applying a current in the opposite direction with a magnitude between 1 uA and 50 uA, with the applied discharge current being the same or higher magnitude than the discharge current applied in Pre-Cycle Stage 3 1330. Stop discharging the cell when the lower voltage is between 0.010V to 1.0V, with the lower voltage cutoff magnitude being the same or higher magnitude than the lower voltage cutoff magnitude utilized in Pre-Cycle Stage 3 1330. Repeat step 1340 charge/discharge schedule as desired and with or without alteration of the previously described current/voltage ranges of step 1340.

FIG. 14 is a block diagram of one preferred structure 1400 of the present battery invention ready for or during operation and after galvanostatic current cycling 1300 is applied. The structure 1400 comprises a novel composite anode 1475 and novel composite electrolyte 1438.

The structure 1400 comprises the trench 150 (trench cavity 158) within the substrate 160. The insulating layers (154, 156) and the bi-layer (230, 240) contain the structure 1400 internals, e.g. anode composite 1475, electrolyte composite 1438, and cathode 1480, within the trench 150. In this non-limiting example embodiment all the structure 1400 internals are within the trench 150 (trench cavity 158.)

Exterior electrical connections to the structure 1400 are made through a cathode contact 1485 (see description of contact 185) and substrate contact 1499 (see description of contact 199.) Encapsulation (192, 194) casing structures and connections to other micro-battery structures 295 to form coin cells or other higher order structures are not shown.

As a result of initial material selection, placement, and structure and the application of galvanostatic current cycling 1300 as described above, movement of materials like Lithium ions, Li+, 1410 and polymers 1415 cause dynamic electrochemical and physical changes in situ in the trench cavity 158 that create new compositions and structures that result in the final operation structure 1400. The anode composite 1475 and the electrolyte composite 1438 are two of these new compositions and structures that enable the enhanced performance of the battery structure 1400.

During the galvanostatic current cycling 1300, as explained above, Lithium ions initially move due to higher conductive of the selected materials to uniformly and fully saturate the substrate 160 with Lithium ions. As electrons are introduced through the substrate contact 1499 and taken from the silicon atoms in the substrate 160, the Lithium metal layer 240 and interphase layer 230 start forming. As explained above, the Lithium metal layer 240 eventually inhibits relatively high magnitudes of Lithium ions from penetrating or leaving the substrate 160, particularly the lithiated regions of the substrate 160A. As discussed, the bi-layer (230, 240) helps contain and isolate the battery internals so when any mechanical or volume change due to lithiation/de-lithiation of the lithiated substrate 160A or plating and stripping from the Lithium metal layer 240, are well compensated for and hence mechanical stress to the system is relieved—enabling a reversibly sustainable novel energy storage device.

However, due to the initial material selection and placement and the novel processes of this invention, other materials, e.g. polymers and Li-ions, are moving through the structure 1400 to form the composite anode 1475 and electrolyte 1438.

As the bi-layer (230, 240) forms, the polymer 170B settles above the lithium metal layer 240 and/or chemically and physically adhered with PANI material to form a novel conductive polymer adhesive layer 1470. In a preferred embodiment, the conductive polymer adhesive layer 1470 contains PANI and the conductive polymers/plasticizers, e.g. SN, that migrated from the electrolyte during the formation of the bi-layer (230, 240.) The polymers in the conductive polymer adhesive layer 1470 create a high ionic conductive region that reduces the internal resistance of the structure 1400 while providing good adhesion between the transformed region of the central anode structure 1477 and the active region 190.

Together the lithiated substrate 160A, bi-layer (230, 240), and the conductive polymer adhesion layer 1470 comprise an anode transition layer bottom 1471 which electrically, chemically, and physically transitions from more independently adhered layers (Active Region 190+polymer 1470+ anode material 1477) to a lower impedance anode composite 1475 which is composed of the precursor anode material, e.g. graphite and polymer electrolyte of homogenous unitary construction due to the electrochemically induced intermixing of the anode material 1477 and polymer material 1470 and therefore higher adhesion and lower charge transferring impedance between the polymer material 1470, bi-layer (230, 240) and lithiated substrate 160A to the silicon substrate 160 material. Hence the electrochemical formation of the anode composite 1475, as produced through the electrochemical pre-cycling steps described in FIG. 13 is the key to the reversibly sustainable high charge storage performance of the In-Silicon energy storage device.

In addition, due to the migration of lithium ions 1410 and polymer 1415 the central anode structure 1477 is transformed into a composite structure of precursor anode material, e.g. graphite, polymer, and lithiated compounds.

Between the central anode structure 1477 and the electrolyte 1430, two transition layers form: a polymer/electrolyte layer 1425 which is an electrolyte bottom region 1425 and a polymer/anode/lithium compound region 1420 or an anode transition layer top 1420. These two layers also form during the galvanostatic current cycling 1300 as selected materials move and combine.

The anode transition layer top 1420 comprises precursor anode material, e.g. graphite, and polymers that migrated into the top of the anode from the electrolyte 1438. In preferred embodiments, these polymers include polycaprolactone (PCl) and succinonitrile (SN). Lithium salts, e.g. LiTFSI may also appear in the anode transition layer top 1420. The composition of the anode transition layer top 1420 creates a more conductive structure which reduces the battery internal resistance. In conjunction with the electrolyte bottom 1425, the anode transition top 1420 creates a strong adhesion between the anode composition 1475 and the electrolyte composition 1438, thereby even further reducing impedance due to charge transfer throughout the cell.

As mentioned, due to the selection and placement of materials and structures and after the galvanostatic current cycling 1300, the anode is transformed in situ into a anode composite 1475 of several different regions all chemically connected to one another and chemically and structurally integrated to form a unified composite—thereby enabling low impedance due to desired ion movement through the cell as well as low resistance to electrical flow to desired areas or materials (e.g. graphite material). The regions of the anode composite 1475 include the lithiated substrate 160A, the interphase 230, the lithium metal layer 240 (that grows and shrinks during charge and discharge cycles), conductive polymer adhesion layer 1470, central anode structure 1477, and the anode transition layer top 1420.

In addition, the electrolyte composition 1438 is created comprising the electrolyte bottom 1425, electrolyte 1430, a separator material (e.g. PAN) and an electrolyte top (above the separator and in contact with the cathode material). The electrolyte 1430 is formed as explained above. However, during current cycling 1300 the polymer (e.g., PCl) and Lithium conducting (e.g., SN) migrate throughout the cell in, vertically, an up or down direction as current is applied to the full energy storage device. Hence the mobility of these SPE components enables a higher saturation of the anode material 1477, thereby further contributing to the formation of the Anode Composite 1475, yet in addition, the electrochemical mobility of these materials with Li-ion movement throughout the cell, creates a well-integrated, void free and low impedance regions designated as the electrolyte bottom 1425 and anode transition layer top 1420—which also contributes greatly to the reversibly sustainable high performance of the In-Silicon energy storage device.

A separator layer 1435 is placed between the Electrolyte 1430 and the Cathode 1480. In preferred embodiments, the separator 1435 adheres to the cathode 1480 surface prior to saturating the separator with ion-conductive material. Once the separator material is saturated, solid polymer electrolyte material resides on both the top and bottom sides of the separator—thereby contacting the material both above (e.g., cathode) and below (e.g., anode) the separator, where the separator resides within the solid polymer electrolyte bulk.

The separator 1435 acts as a dielectric—but, in addition and critically, the separator 1435 is a dielectric which allows for ions (Li-ions) to flow through it 1435, but not electrons. If electrons were able to flow through the center region of the cell, then the cell would short circuit and, in the case of Lithium batteries, dendrites may form.

In the present invention, the separator (PAN) is a woven fabric-like polymer material which is not conductive to electrons. However, because it is an interwoven, fabric like material, it can be easily saturated with the polymer electrolyte (PCl/SN). This saturation means that there is complete physical/chemically and therefore ionic transport through the separator 1435. In a preferred embodiment, the separator 1435 is a polymer electrolyte saturated separator 1435. In a preferred embodiment, the electrolyte 1430 is a SPE structure, described above, where there is polymer electrolyte (PCl) above, in the middle of and below the separator 1435 material.

Figure 15:
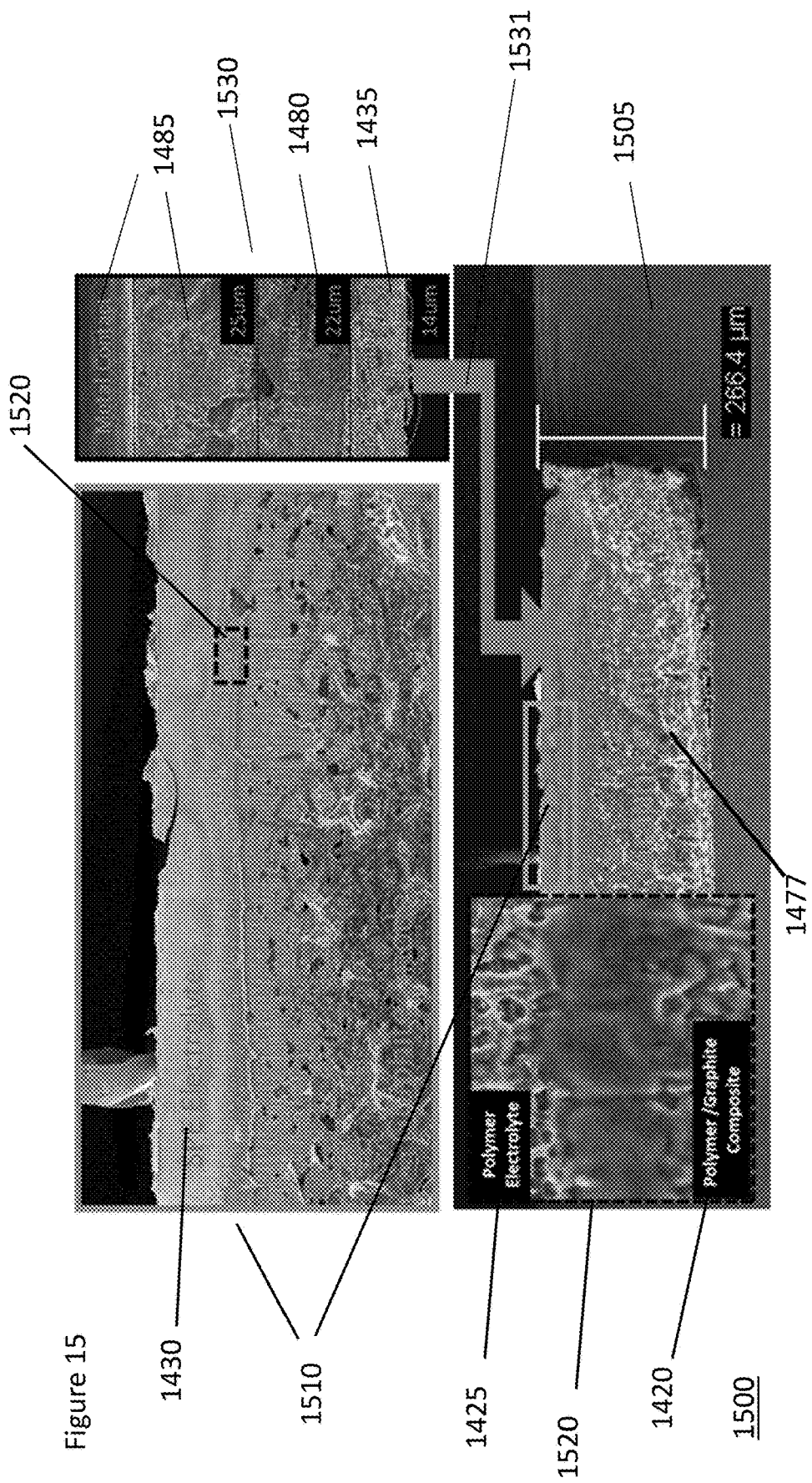
FIG. 15 is a composite micrograph showing various regions of the battery structure in FIG. 14.

FIG. 15 is a composite micrograph 1500 showing various regions of the battery structure 1400 in FIG. 14.

Micrograph 1505 is the lowest magnification micrograph and shows the upper part of entire anode structure 1477 including the upper portion of the anode and polymer electrolyte structure region 1510. Region 1510 is showing a higher magnification of the electrolyte 1430 and the electrolyte bottom 1425 and anode transition layer top 1420. Micrograph 1520 is even a higher magnification showing the electrolyte 1430 and the electrolyte bottom 1425.

Micrograph 1530 is a high magnification micrograph of the cathode material which was in chemical/physical/electrochemical contact with the substrate/anode/electrolyte region depicted in 1505 and 1510. Note that these micrographs were taken of an In-Silicon energy storage device following electrochemical charge and discharge cycles. In order to deconstruct the cell and obtain the micrographs of the respective cross sections, the cathode region 1530 had to be separated from the substrate/anode/polymer electrolyte regions 1505, 1510. FIG. 15 depicts all of the major components of a post-mortem In-Silicon energy storage device, yet in a partially assembled manner. Micrograph 1530 shows the separator 1435, cathode 1480, and metal cathode contact 1485.

The large arrow 1531 in FIG. 15 illustrates that the separator 1435, cathode 1480, and cathode contact 1485 go on top of the electrolyte surface (the entire electrolyte surface) 1430, which displayed in 1510 and 1505—in order to function like a full In-Silicon cell.

The inventions disclosed and the invention specifically claimed in this disclosure enable a significant improvement in energy storage devices, compositions, methods, and structures that have use in the IoT sector, microelectronic device sector, CMOS circuit sector and other applications. As disclosed, some embodiments have use as miniaturized energy storage devices embedded in complementary metal-oxide-semiconductor (CMOS) circuits or as stand-alone microbatteries encapsulated in 3D patterned silicon material or semiconductor material which can then be integrated with any electronic or microelectronic device. Given this disclosure, one skilled in the art can envision emerging applications requiring such on-board next generation energy storage devices including IoT devices, mobile devices, sensory equipment, and various autonomous environment, biological, neuromorphic and social functioning machines. Smart dust and biomedical sensory and drug delivery devices are examples of such functional devices. Among other things, these uses are contemplated by this disclosure.

It should also be noted that while this invention presently targets the micro and IoT device/application sectors, that the fundamental energy storage device materials and functions (e.g., composite materials formation, silicon active anode integration, utilizing Silicon for encapsulation of ⅝'s of active battery area) are applicable to other, relatively macro, applications, such as smart phones, electric vehicles, renewable energy storage, grid energy storage, etc.

The descriptions of the various embodiments of the present invention have been presented for purposes of illustration but are not intended to be exhaustive or limited to the embodiments disclosed. Given this disclosure, many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A Lithium energy storage device comprising:
   an electrically conductive cathode made of a Lithium cathode composition, the electrically conductive cathode having an external cathode connection and being capable of producing Lithium ions within the device;
   a composite electrolyte having an electrolyte top region, a separator, and an electrolyte bottom region, the electrolyte top region electrically, chemically, and physically transitioning into the cathode, the transitioning into the cathode being the percentage of the Lithium cathode composition increasing in locations of the electrolyte top region nearer to the electrically conductive cathode;
   a composite anode made of an anode material, the composite anode having a transition layer top and a transition layer bottom, the transition layer top electrically, chemically, and physically transitioning into the electrolyte bottom region; and the transition layer bottom containing graphite and an electrically and ionically conductive adhesive, the transition layer bottom that electrically, chemically, and physically transitions to and contains a bi-layer, the physical transitioning of the transition layer top into the electrolyte bottom region being one or more polymers that migrated into the transition layer top from the electrolyte bottom region and the physically transitioning of the transition layer bottom to the bi-layer being an increase in Lithium metal in the transition layer bottom in locations in the transition layer bottom closer to the bi-layer, the bi-layer comprising:
      a Lithium metal layer made of Lithium metal, the Lithium metal layer having a Lithium metal layer top and a Lithium metal layer bottom, the Lithium metal layer top being electrically and physically connected to the transition layer bottom; and
      an interphase layer with an interphase top and an interphase bottom, the interphase top electrically and physically connected to the Lithium metal layer bottom; and
   a lithiated silicon substrate with an external electrical connection and the lithiated silicon substrate being electrically, chemically and physically connected to the interphase bottom,
   wherein the interphase layer enables electrons moving into the interphase layer to combine with the Lithium ions from the cathode to form the Lithium metal in the Lithium metal layer above the interphase top.

2. A device, as in claim 1, where the lithiated silicon substrate comprises one of the following: a non-porous silicon, a partially porous crystalline silicon, a single-crystal non-porous silicon substrate, crystalline silicon, a low resistance doped crystalline silicon, a boron doped crystalline silicon, or a crystalline silicon material doped with Boron at a concentration of approximately $10^{19}$ cm$^{-3}$.

3. A device, as in claim 1, where the lithiated silicon substrate is infused with one or more of: Lithium ions and lithium metal.

4. A device, as in claim 1, where the concentration of Lithium ions and Lithium metal gradually decreases with distance in the direction away from the interphase top into the lithiated silicon substrate.

5. A device, as in claim 1, where the interphase layer is less than 35 nm thick.

6. A device, as in claim 1, where the Lithium metal layer is uniform thickness and less than 35 nm thick when the device is in a discharged state.

7. A device, as in claim 1, where the transition layer bottom is made of a uniform mixture of the anode material, a Lithium compound, and a conductive adhesive.

8. A device, as in claim 7, where the percentage composition of the anode material increases uniformly in a direction away from the Lithium metal layer and in a direction towards the cathode.

9. A device, as in claim 7, where the anode material is any one or more of the following: graphite, lithiated graphite, activated carbon, carbon and lithium based mixtures, lithium metal, lithium powder/carbon powder composites, lithium composite material saturated in a conductive adhesive mixture, lithium titanate material (LTO), silicon/carbon based material, silicon/carbon/additive based material, lithium powder/carbon/solid electrolyte composite, and a Li-charge hosting anode material.

10. A device, as in claim 7, where the Lithium compound is any one or more of the following: a Lithium salt compound, lithium hexafluorophosphate, lithium perchlorate, lithium trifluoromethanesulfonate, lithium fluoride, lithium bromide, lithium phosphate compounds, lithium bromide compounds, and Lithium bis(trifluoromethanesulfonyl)imide (LiTFSi).

11. A device, as in claim 7, where the conductive adhesive is any one or more of the following: polypyrrol, polythiophene, polyaniline (PANI), polyphenylene sulfide, and a conductive adhesive polymer.

12. A device, as in claim 1, where the transition layer bottom is greater than 100 nm thick.

13. A device, as in claim 1, where the bi-layer acts as a barrier to inhibit the flow of Lithium ions into and out of the solid silicon substrate.

14. A Lithium energy storage device comprising:
an electrically conductive cathode made of a Lithium cathode composition, the electrically conductive cathode having an external cathode connection and being capable of producing Lithium ions within the device;
a composite electrolyte having an electrolyte top region, a separator, and an electrolyte bottom region, the electrolyte top region electrically, chemically, and physically transitioning into the cathode, the transitioning into the cathode being the percentage of the Lithium cathode composition increasing in locations of the electrolyte top region nearer to the electrically conductive cathode;
a substrate with one or more trenches, each of the trenches having one or more trench sides and a trench bottom, the substrate made of lithiated silicon and having one or more external electrical contacts and a substrate top;
a composite anode made of an anode material and being within one of the trenches, the anode material containing graphite, the composite anode having a transition layer top and a transition layer bottom, the transition layer top electrically, chemically, and physically transitioning into the electrolyte bottom region and the transition layer bottom electrically, chemically, and physically transitioning into and containing a bi-layer, the physical transitioning of the transition layer top into the electrolyte bottom region being one or more polymers that migrated into the transition layer top from the electrolyte bottom region and the physical transitioning of the transition layer bottom to the bi-layer being an increase in Lithium metal in the transition layer bottom in locations in the transition layer bottom closer to the bi-layer, the bi-layer comprising:
a Lithium metal layer made of Lithium metal, the Lithium metal layer having a Lithium metal layer top and a Lithium metal layer bottom, the Lithium metal layer top being electrically and physically connected to the transition layer bottom; and
an interphase layer with an interphase top and an interphase bottom, the interphase top electrically and physically connected to the Lithium metal layer bottom and the interphase bottom electrically and physically connected to the lithiated silicon substrate at a bottom of the trench,
wherein the interphase layer enables electrons moving into the interphase layer from the substrate to combine with Lithium ions from the cathode in order to form the Lithium metal in the Lithium metal layer above the interphase top.

15. A device, as in claim 14, where one or more of the trenches is through the substrate top into the substrate, each trench further comprising a trench cavity defined by the bi-layer and the trench sides, a trench depth, and a trench opening with a trench opening area, the trench further comprising:
one or more insulating layers covering the trench sides within the trench cavity and covering the substrate top forming one or more insulated trench sides and an insulated substrate top,
wherein the insulating layer(s) have been completely or partially removed from the trench bottom.

16. A device, as in claim 15, where the insulating layers comprise one or more of the following: a first layer, a first and second layer, the first layer made of one of $SiO_2$ and $Si_3N_4$, and the second layer made of one of $SiO_2$ and $Si_3N_4$.

17. A device, as in claim 14, where some or all of the composite electrolyte is also disposed within the trench.

18. A device, as in claim 14, where the Lithium cathode composition comprises one or more of the following: Lithium Cobalt Oxide (LCO), lithium manganese oxide (LiMn2O4) (LMO), Lithium Manganese Oxyflouride (Li2MnO2F), lithium nickel manganese cobalt oxide (LiNiMnCoO2) (NMC), lithium manganese nickel oxide (LiMn1.5Ni0.5O4), lithium iron phosphate (LiFePO4), lithium iron manganese phosphate (LiFeMnPO4), and lithium nickel cobalt aluminum oxide (LiNiCoAlO2) (NCA).

19. A Lithium energy storage device comprising:
an electrically conductive cathode made of a Lithium cathode composition, the electrically conductive cathode having an external cathode connection and being capable of producing Lithium ions within the device;

a composite Solid Polymer Electrolyte (SPE) having an electrolyte top interface, a separator layer, and an electrolyte bottom interface, the electrolyte top interface being electrically, chemically, and physically connected to the cathode, the electrolyte top interface and the electrolyte bottom interface made of a Lithium compound immersed in the separator layer, the separator layer made of a fiber-woven material;

an anode having and anode top, the anode top being electrically, chemically, and physically connected to the electrolyte bottom interface, and an anode bottom being a bi-layer comprising:
- a transition layer with a transition layer bottom; and
- a Lithium metal layer having a Lithium metal layer top and a Lithium metal layer bottom, the Lithium metal layer top being electrically, chemically, and physically connected to the transition layer bottom;
- an interphase with an interphase top and an interphase bottom, the interphase top connected to the Lithium metal layer bottom; and a solid silicon substrate with an external electrical connection and one or more trenches, each trench having a trench bottom, the anode, including the bi-layer, being disposed within the trench and the interphase bottom connected to the trench bottom.

20. A device, as in claim 19, the thickness of the composite SPE is between 28 µm and 82 µm.

* * * * *